United States Patent
Hayashi et al.

(10) Patent No.: US 7,212,743 B2
(45) Date of Patent: May 1, 2007

(54) OPTICAL SWITCH DEVICE, AND OPTICAL RECEPTION DEVICE AND OPTICAL SWITCH NETWORK IN WHICH THE OPTICAL SWITCH DEVICE IS APPLIED

(75) Inventors: Kazuhiko Hayashi, Tokyo (JP); Akinobu Sato, Tokyo (JP); Hirotaka Hokkyo, Tokyo (JP)

(73) Assignee: NEC Corporation, Tokyo (JP)

( * ) Notice: Subject to any disclaimer, the term of this patent is extended or adjusted under 35 U.S.C. 154(b) by 889 days.

(21) Appl. No.: 10/166,611

(22) Filed: Jun. 12, 2002

(65) Prior Publication Data

US 2003/0021521 A1    Jan. 30, 2003

(30) Foreign Application Priority Data

Jul. 17, 2001 (JP) ............... 2001-216878

(51) Int. Cl.
| | |
|---|---|
| *H04J 14/00* | (2006.01) |
| *G02F 1/1333* | (2006.01) |
| *G02F 1/13* | (2006.01) |
| *G02B 6/26* | (2006.01) |
| *G02B 6/42* | (2006.01) |

(52) U.S. Cl. .................. 398/45; 398/55; 349/159; 349/196; 385/17

(58) Field of Classification Search .......... 398/45, 398/55; 349/196, 159; 385/16–23
See application file for complete search history.

(56) References Cited

U.S. PATENT DOCUMENTS 6,559,921 B1 *  5/2003  Leslie et al. ............... 349/196

2004/0114899 A1 *  6/2004  Mattsson ............... 385/129

FOREIGN PATENT DOCUMENTS

| JP | 1-182878 | 7/1989 |
|---|---|---|
| JP | 05-273603 | 10/1993 |
| JP | 06-043504 | 2/1994 |
| JP | 06-088968 | 3/1994 |
| JP | 06-332022 | 12/1994 |
| JP | 7-199237 | 8/1995 |
| JP | 11-018118 | 1/1999 |
| JP | 2000-197078 | 7/2000 |

OTHER PUBLICATIONS

Barry, Richard A., et al., "Latin Routers, Design and Implementation", Journal of Lighwave Technology, vol. 11, No. 5/6. May/Jun. 1993, 9 pgs.
Uchida, T., "TN drive system reflection type color LCD(2)" Technology of Relective Color Liquid Crystals Displays, (1999), 3 pgs w/English abstract translation.
Japanese Office Action dated Jun. 18, 2006, with English translation of pertinent portions.

* cited by examiner

*Primary Examiner*—Jason Chan
*Assistant Examiner*—Nathan Curs
(74) *Attorney, Agent, or Firm*—Whitham Curtis Christofferson & Cook, PC

(57) ABSTRACT

The configuration of a liquid crystal switch capable of reducing attenuation in an optical switch, and an optical reception device and an optical switch network that use this liquid crystal switch device are described. The liquid crystal switch device includes optical switches that perform ON/OFF switching of light beams by applying a voltage to the liquid crystal. The attenuation is further reduced by installing the ends of the optical fibers in depressions (or holes) that are formed in the substrate on which the switch elements are formed and in the liquid crystal encapsulation substrate.

14 Claims, 32 Drawing Sheets

Fig. 3
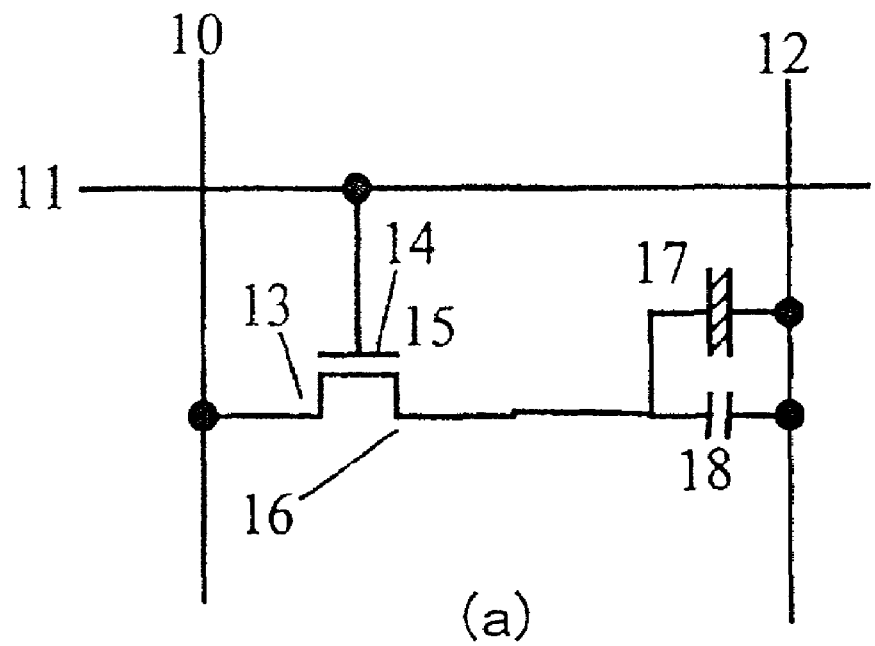
(a)
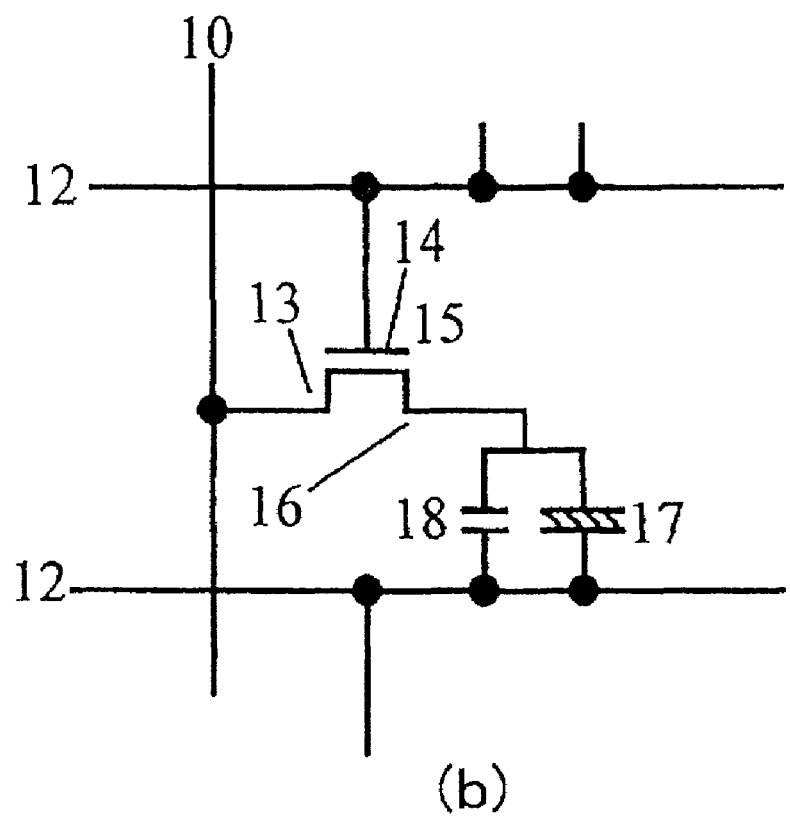
(b)

Fig. 7
(a)
110
108a
(b)
111
110
(c)
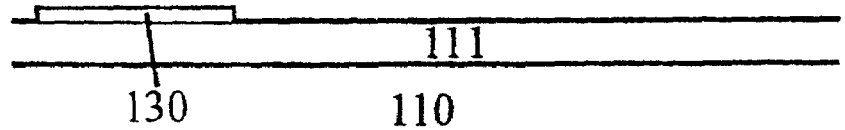
130   110
(d)
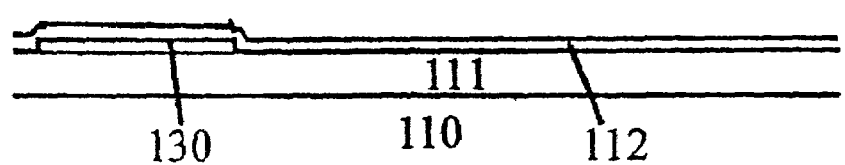
130   110   112
(e)
121
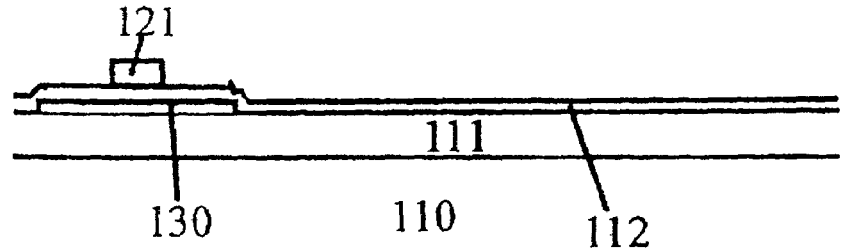
130   110   112

Fig. 12
(m) 110
(n) 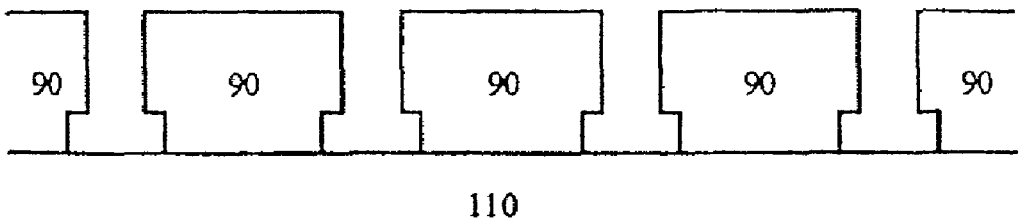
110
(o) 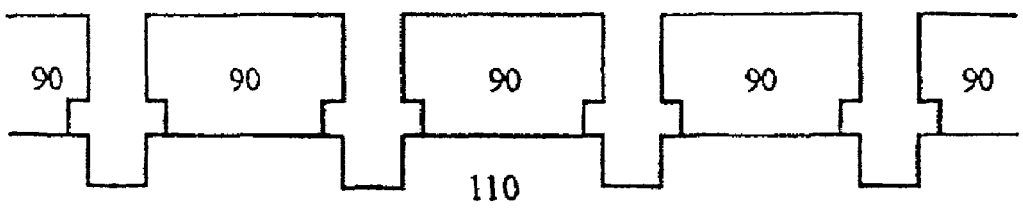
110
(p) 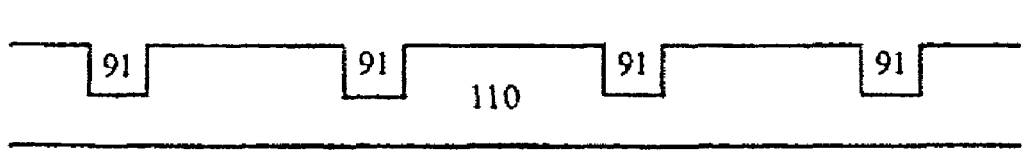
110

Fig. 22

| INPUT PORT | OUTPUT PORT | | | |
|---|---|---|---|---|
| | o0 | o1 | o2 | o3 |
| i0 | λ0, λ1, λ2, λ3<br>λ4, λ5, λ6, λ7<br>λ8, λ9, λ10, λ11<br>λ12, λ13, λ14, λ15 | λ16, λ17, λ18, λ19<br>λ20, λ21, λ22, λ23<br>λ24, λ25, λ26, λ27<br>λ28, λ29, λ30, λ31 | λ32, λ33, λ34, λ35<br>λ36, λ37, λ38, λ39<br>λ40, λ41, λ42, λ43<br>λ44, λ45, λ46, λ47 | λ48, λ49, λ50, λ51<br>λ52, λ53, λ54, λ55<br>λ56, λ57, λ58, λ59<br>λ60, λ61, λ62, λ63 |
| i1 | λ48, λ49, λ50, λ51<br>λ52, λ53, λ54, λ55<br>λ56, λ57, λ58, λ59<br>λ60, λ61, λ62, λ63 | λ0, λ1, λ2, λ3<br>λ4, λ5, λ6, λ7<br>λ8, λ9, λ10, λ11<br>λ12, λ13, λ14, λ15 | λ16, λ17, λ18, λ19<br>λ20, λ21, λ22, λ23<br>λ24, λ25, λ26, λ27<br>λ28, λ29, λ30, λ31 | λ32, λ33, λ34, λ35<br>λ36, λ37, λ38, λ39<br>λ40, λ41, λ42, λ43<br>λ44, λ45, λ46, λ47 |
| i2 | λ32, λ33, λ34, λ35<br>λ36, λ37, λ38, λ39<br>λ40, λ41, λ42, λ43<br>λ44, λ45, λ46, λ47 | λ48, λ49, λ50, λ51<br>λ52, λ53, λ54, λ55<br>λ56, λ57, λ58, λ59<br>λ60, λ61, λ62, λ63 | λ0, λ1, λ2, λ3<br>λ4, λ5, λ6, λ7<br>λ8, λ9, λ10, λ11<br>λ12, λ13, λ14, λ15 | λ16, λ17, λ18, λ19<br>λ20, λ21, λ22, λ23<br>λ24, λ25, λ26, λ27<br>λ28, λ29, λ30, λ31 |
| i3 | λ16, λ17, λ18, λ19<br>λ20, λ21, λ22, λ23<br>λ24, λ25, λ26, λ27<br>λ28, λ29, λ30, λ31 | λ32, λ33, λ34, λ35<br>λ36, λ37, λ38, λ39<br>λ40, λ41, λ42, λ43<br>λ44, λ45, λ46, λ47 | λ48, λ49, λ50, λ51<br>λ52, λ53, λ54, λ55<br>λ56, λ57, λ58, λ59<br>λ60, λ61, λ62, λ63 | λ0, λ1, λ2, λ3<br>λ4, λ5, λ6, λ7<br>λ8, λ9, λ10, λ11<br>λ12, λ13, λ14, λ15 |

Fig. 23

| INPUT PORT | OUTPUT PORT | | | |
|---|---|---|---|---|
| | o0 | o1 | o2 | o3 |
| i0 | $\lambda 0, \lambda 1, \lambda 2, \lambda 3,$ $\lambda 16, \lambda 17, \lambda 18, \lambda 19,$ $\lambda 32, \lambda 33, \lambda 34, \lambda 35,$ $\lambda 48, \lambda 49, \lambda 50, \lambda 51$ | $\lambda 4, \lambda 5, \lambda 6, \lambda 7,$ $\lambda 20, \lambda 21, \lambda 22, \lambda 23,$ $\lambda 36, \lambda 37, \lambda 38, \lambda 39,$ $\lambda 52, \lambda 53, \lambda 54, \lambda 55$ | $\lambda 8, \lambda 9, \lambda 10, \lambda 11,$ $\lambda 24, \lambda 25, \lambda 26, \lambda 27,$ $\lambda 40, \lambda 41, \lambda 42, \lambda 43,$ $\lambda 56, \lambda 57, \lambda 58, \lambda 59$ | $\lambda 12, \lambda 13, \lambda 14, \lambda 15,$ $\lambda 28, \lambda 29, \lambda 30, \lambda 31,$ $\lambda 44, \lambda 45, \lambda 46, \lambda 47,$ $\lambda 60, \lambda 61, \lambda 62, \lambda 63$ |
| i1 | $\lambda 12, \lambda 13, \lambda 14, \lambda 15,$ $\lambda 28, \lambda 29, \lambda 30, \lambda 31,$ $\lambda 44, \lambda 45, \lambda 46, \lambda 47,$ $\lambda 60, \lambda 61, \lambda 62, \lambda 63$ | $\lambda 0, \lambda 1, \lambda 2, \lambda 3,$ $\lambda 16, \lambda 17, \lambda 18, \lambda 19,$ $\lambda 32, \lambda 33, \lambda 34, \lambda 35,$ $\lambda 48, \lambda 49, \lambda 50, \lambda 51$ | $\lambda 4, \lambda 5, \lambda 6, \lambda 7,$ $\lambda 20, \lambda 21, \lambda 22, \lambda 23,$ $\lambda 36, \lambda 37, \lambda 38, \lambda 39,$ $\lambda 52, \lambda 53, \lambda 54, \lambda 55$ | $\lambda 8, \lambda 9, \lambda 10, \lambda 11,$ $\lambda 24, \lambda 25, \lambda 26, \lambda 27,$ $\lambda 40, \lambda 41, \lambda 42, \lambda 43,$ $\lambda 56, \lambda 57, \lambda 58, \lambda 59$ |
| i2 | $\lambda 8, \lambda 9, \lambda 10, \lambda 11,$ $\lambda 24, \lambda 25, \lambda 26, \lambda 27,$ $\lambda 40, \lambda 41, \lambda 42, \lambda 43,$ $\lambda 56, \lambda 57, \lambda 58, \lambda 59$ | $\lambda 12, \lambda 13, \lambda 14, \lambda 15,$ $\lambda 28, \lambda 29, \lambda 30, \lambda 31,$ $\lambda 44, \lambda 45, \lambda 46, \lambda 47,$ $\lambda 60, \lambda 61, \lambda 62, \lambda 63$ | $\lambda 0, \lambda 1, \lambda 2, \lambda 3,$ $\lambda 16, \lambda 17, \lambda 18, \lambda 19,$ $\lambda 32, \lambda 33, \lambda 34, \lambda 35,$ $\lambda 48, \lambda 49, \lambda 50, \lambda 51$ | $\lambda 4, \lambda 5, \lambda 6, \lambda 7,$ $\lambda 20, \lambda 21, \lambda 22, \lambda 23,$ $\lambda 36, \lambda 37, \lambda 38, \lambda 39,$ $\lambda 52, \lambda 53, \lambda 54, \lambda 55$ |
| i3 | $\lambda 4, \lambda 5, \lambda 6, \lambda 7,$ $\lambda 20, \lambda 21, \lambda 22, \lambda 23,$ $\lambda 36, \lambda 37, \lambda 38, \lambda 39,$ $\lambda 52, \lambda 53, \lambda 54, \lambda 55$ | $\lambda 8, \lambda 9, \lambda 10, \lambda 11,$ $\lambda 24, \lambda 25, \lambda 26, \lambda 27,$ $\lambda 40, \lambda 41, \lambda 42, \lambda 43,$ $\lambda 56, \lambda 57, \lambda 58, \lambda 59$ | $\lambda 12, \lambda 13, \lambda 14, \lambda 15,$ $\lambda 28, \lambda 29, \lambda 30, \lambda 31,$ $\lambda 44, \lambda 45, \lambda 46, \lambda 47,$ $\lambda 60, \lambda 61, \lambda 62, \lambda 63$ | $\lambda 0, \lambda 1, \lambda 2, \lambda 3,$ $\lambda 16, \lambda 17, \lambda 18, \lambda 19,$ $\lambda 32, \lambda 33, \lambda 34, \lambda 35,$ $\lambda 48, \lambda 49, \lambda 50, \lambda 51$ |

Fig. 24

| | | OUTPUT PORT | | | |
|---|---|---|---|---|---|
| | | o0 | o1 | o2 | o3 |
| INPUT PORT | i0 | λ0, λ4, λ8, λ12, λ16, λ20, λ24, λ28, λ32, λ36, λ40, λ44, λ48, λ52, λ58, λ60 | λ1, λ5, λ9, λ13, λ17, λ21, λ25, λ29, λ33, λ37, λ41, λ45, λ49, λ53, λ57, λ61 | λ2, λ6, λ10, λ14, λ18, λ22, λ26, λ30, λ34, λ38, λ42, λ46, λ50, λ54, λ58, λ62 | λ3, λ7, λ11, λ15, λ19, λ23, λ27, λ31, λ35, λ39, λ43, λ47, λ51, λ55, λ59, λ63 |
| | i1 | λ3, λ7, λ11, λ15, λ19, λ23, λ27, λ31, λ35, λ39, λ43, λ47, λ51, λ55, λ59, λ63 | λ0, λ4, λ8, λ12, λ16, λ20, λ24, λ28, λ32, λ36, λ40, λ44, λ48, λ52, λ58, λ60 | λ1, λ5, λ9, λ13, λ17, λ21, λ25, λ29, λ33, λ37, λ41, λ45, λ49, λ53, λ57, λ61 | λ2, λ6, λ10, λ14, λ18, λ22, λ26, λ30, λ34, λ38, λ42, λ46, λ50, λ54, λ58, λ62 |
| | i2 | λ2, λ6, λ10, λ14, λ18, λ22, λ26, λ30, λ34, λ38, λ42, λ46, λ50, λ54, λ58, λ62 | λ3, λ7, λ11, λ15, λ19, λ23, λ27, λ31, λ35, λ39, λ43, λ47, λ51, λ55, λ59, λ63 | λ0, λ4, λ8, λ12, λ16, λ20, λ24, λ28, λ32, λ36, λ40, λ44, λ48, λ52, λ58, λ60 | λ1, λ5, λ9, λ13, λ17, λ21, λ25, λ29, λ33, λ37, λ41, λ45, λ49, λ53, λ57, λ61 |
| | i3 | λ1, λ5, λ9, λ13, λ17, λ21, λ25, λ29, λ33, λ37, λ41, λ45, λ49, λ53, λ57, λ61 | λ2, λ6, λ10, λ14, λ18, λ22, λ26, λ30, λ34, λ38, λ42, λ46, λ50, λ54, λ58, λ62 | λ3, λ7, λ11, λ15, λ19, λ23, λ27, λ31, λ35, λ39, λ43, λ47, λ51, λ55, λ59, λ63 | λ0, λ4, λ8, λ12, λ16, λ20, λ24, λ28, λ32, λ36, λ40, λ44, λ48, λ52, λ58, λ60 |

Fig. 30

|  | | OUTPUT PORT | | | |
|---|---|---|---|---|---|
| | | o0 | o1 | o2 | o3 |
| INPUT PORT | i0 | λ0a, λ1a, λ2a, λ3a<br>λ4a, λ5a, λ6a, λ7a<br>λ8a, λ9a, λ10a, λ11a<br>λ12a, λ13a, λ14a, λ15a<br>λ16a, λ17a, λ18a, λ19a<br>λ20a, λ21a, λ22a, λ23a<br>λ24a, λ25a, λ26a, λ27a<br>λ28a, λ29a, λ30a, λ31a<br>λ32a, λ33a, λ34a, λ35a<br>λ36a, λ37a, λ38a, λ39a<br>λ40a, λ41a, λ42a, λ43a<br>λ44a, λ45a, λ46a, λ47a<br>λ48a, λ49a, λ50a, λ51a<br>λ52a, λ53a, λ54a, λ55a<br>λ56a, λ57a, λ58a, λ59a<br>λ60a, λ61a, λ62a, λ63a | λ0b, λ1b, λ2b, λ3b<br>λ4b, λ5b, λ6b, λ7b<br>λ8b, λ9b, λ10b, λ11b<br>λ12b, λ13b, λ14b, λ15b<br>λ16b, λ17b, λ18b, λ19b<br>λ20b, λ21b, λ22b, λ23b<br>λ24b, λ25b, λ26b, λ27b<br>λ28b, λ29b, λ30b, λ31b<br>λ32b, λ33b, λ34b, λ35b<br>λ36b, λ37b, λ38b, λ39b<br>λ40b, λ41b, λ42b, λ43b<br>λ44b, λ45b, λ46b, λ47b<br>λ48b, λ49b, λ50b, λ51b<br>λ52b, λ53b, λ54b, λ55b<br>λ56b, λ57b, λ58b, λ59b<br>λ60b, λ61b, λ62b, λ63b | λ0c, λ1c, λ2c, λ3c<br>λ4c, λ5c, λ6c, λ7c<br>λ8c, λ9c, λ10c, λ11c<br>λ12c, λ13c, λ14c, λ15c<br>λ16c, λ17c, λ18c, λ19c<br>λ20c, λ21c, λ22c, λ23c<br>λ24c, λ25c, λ26c, λ27c<br>λ28c, λ29c, λ30c, λ31c<br>λ32c, λ33c, λ34c, λ35c<br>λ36c, λ37c, λ38c, λ39c<br>λ40c, λ41c, λ42c, λ43c<br>λ44c, λ45c, λ46c, λ47c<br>λ48c, λ49c, λ50c, λ51c<br>λ52c, λ53c, λ54c, λ55c<br>λ56c, λ57c, λ58c, λ59c<br>λ60c, λ61c, λ62c, λ63c | λ0d, λ1d, λ2d, λ3d<br>λ4d, λ5d, λ6d, λ7d<br>λ8d, λ9d, λ10d, λ11d<br>λ12d, λ13d, λ14d, λ15d<br>λ16d, λ17d, λ18d, λ19d<br>λ20d, λ21d, λ22d, λ23d<br>λ24d, λ25d, λ26d, λ27d<br>λ28d, λ29d, λ30d, λ31d<br>λ32d, λ33d, λ34d, λ35d<br>λ36d, λ37d, λ38d, λ39d<br>λ40d, λ41d, λ42d, λ43d<br>λ44d, λ45d, λ46d, λ47d<br>λ48d, λ49d, λ50d, λ51d<br>λ52d, λ53d, λ54d, λ55d<br>λ56d, λ57d, λ58d, λ59d<br>λ60d, λ61d, λ62d, λ63d |
| | i1 | λ0d, λ1d, λ2d, λ3d<br>λ4d, λ5d, λ6d, λ7d<br>λ8d, λ9d, λ10d, λ11d<br>λ12d, λ13d, λ14d, λ15d<br>λ16d, λ17d, λ18d, λ19d<br>λ20d, λ21d, λ22d, λ23d<br>λ24d, λ25d, λ26d, λ27d<br>λ28d, λ29d, λ30d, λ31d<br>λ32d, λ33d, λ34d, λ35d<br>λ36d, λ37d, λ38d, λ39d<br>λ40d, λ41d, λ42d, λ43d<br>λ44d, λ45d, λ46d, λ47d<br>λ48d, λ49d, λ50d, λ51d<br>λ52d, λ53d, λ54d, λ55d<br>λ56d, λ57d, λ58d, λ59d<br>λ60d, λ61d, λ62d, λ63d | λ0a, λ1a, λ2a, λ3a<br>λ4a, λ5a, λ6a, λ7a<br>λ8a, λ9a, λ10a, λ11a<br>λ12a, λ13a, λ14a, λ15a<br>λ16a, λ17a, λ18a, λ19a<br>λ20a, λ21a, λ22a, λ23a<br>λ24a, λ25a, λ26a, λ27a<br>λ28a, λ29a, λ30a, λ31a<br>λ32a, λ33a, λ34a, λ35a<br>λ36a, λ37a, λ38a, λ39a<br>λ40a, λ41a, λ42a, λ43a<br>λ44a, λ45a, λ46a, λ47a<br>λ48a, λ49a, λ50a, λ51a<br>λ52a, λ53a, λ54a, λ55a<br>λ56a, λ57a, λ58a, λ59a<br>λ60a, λ61a, λ62a, λ63a | λ0b, λ1b, λ2b, λ3b<br>λ4b, λ5b, λ6b, λ7b<br>λ8b, λ9b, λ10b, λ11b<br>λ12b, λ13b, λ14b, λ15b<br>λ16b, λ17b, λ18b, λ19b<br>λ20b, λ21b, λ22b, λ23b<br>λ24b, λ25b, λ26b, λ27b<br>λ28b, λ29b, λ30b, λ31b<br>λ32b, λ33b, λ34b, λ35b<br>λ36b, λ37b, λ38b, λ39b<br>λ40b, λ41b, λ42b, λ43b<br>λ44b, λ45b, λ46b, λ47b<br>λ48b, λ49b, λ50b, λ51b<br>λ52b, λ53b, λ54b, λ55b<br>λ56b, λ57b, λ58b, λ59b<br>λ60b, λ61b, λ62b, λ63b | λ0c, λ1c, λ2c, λ3c<br>λ4c, λ5c, λ6c, λ7c<br>λ8c, λ9c, λ10c, λ11c<br>λ12c, λ13c, λ14c, λ15c<br>λ16c, λ17c, λ18c, λ19c<br>λ20c, λ21c, λ22c, λ23c<br>λ24c, λ25c, λ26c, λ27c<br>λ28c, λ29c, λ30c, λ31c<br>λ32c, λ33c, λ34c, λ35c<br>λ36c, λ37c, λ38c, λ39c<br>λ40c, λ41c, λ42c, λ43c<br>λ44c, λ45c, λ46c, λ47c<br>λ48c, λ49c, λ50c, λ51c<br>λ52c, λ53c, λ54c, λ55c<br>λ56c, λ57c, λ58c, λ59c<br>λ60c, λ61c, λ62c, λ63c |

Fig. 31

Fig. 33
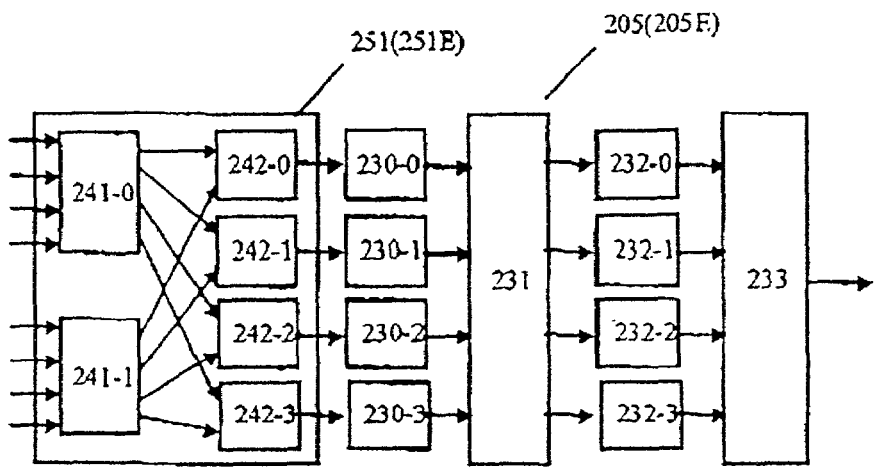
Fig. 34
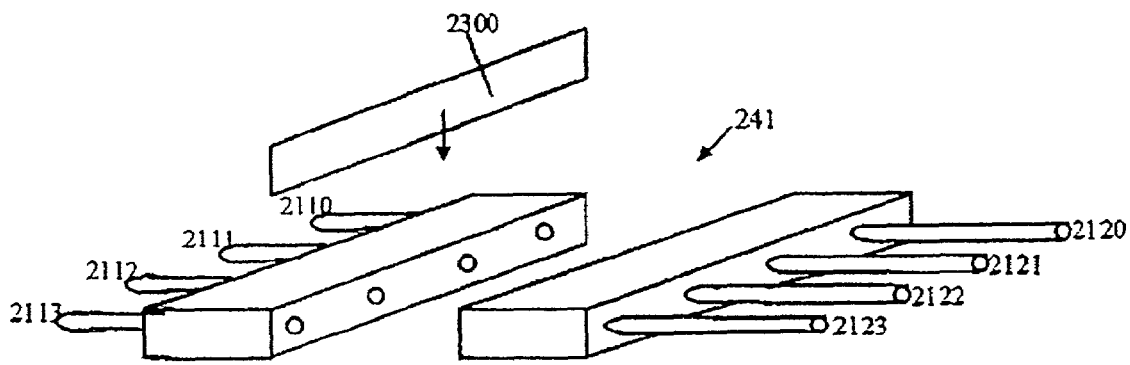
Fig. 35
|  |  | OUTPUT PORT | | | |
|---|---|---|---|---|---|
|  |  | o0 | o1 | o2 | o3 |
| INPUT PORT | i0 | λ0 | λ1 | λ2 | λ3 |
|  | i1 | λ3 | λ0 | λ1 | λ2 |
|  | i2 | λ2 | λ3 | λ0 | λ1 |
|  | i3 | λ1 | λ2 | λ3 | λ0 |

| | | OUTPUT PORT | |
|---|---|---|---|
| | | o0 | o0 |
| INPUT PORT | i0 | λ0, λ1 | λ2, λ3 |
| | i0 | λ2, λ3 | λ0, λ1 |

Fig. 38

|  |  | OUTPUT PORT | |
|---|---|---|---|
|  |  | o0 | o1 |
| INPUT PORT | i0 | λ0, λ2 | λ1, λ3 |
|  | i1 | λ1, λ3 | λ0, λ2 |

| | | OUTPUT PORT | | | |
|---|---|---|---|---|---|
| | | o0 | o1 | o2 | o3 |
| INPUT PORT | i0 | λ0a, λ0a, λ0a, λ0a | λ0b, λ0b, λ0b, λ0b | λ0c, λ0c, λ0c, λ0c | λ0d, λ0d, λ0d, λ0d |
| | i1 | λ0d, λ0d, λ0d, λ0d | λ0a, λ0a, λ0a, λ0a | λ0b, λ0b, λ0b, λ0b | λ0c, λ0c, λ0c, λ0c |

OPTICAL SWITCH DEVICE, AND OPTICAL RECEPTION DEVICE AND OPTICAL SWITCH NETWORK IN WHICH THE OPTICAL SWITCH DEVICE IS APPLIED

BACKGROUND OF THE INVENTION

1. Field of the Invention

The present invention relates to an optical reception device and an optical switch network that are used in a communication network or an interconnected network of parallel computers.

2. Description of the Related Art

An optical switch that uses liquid crystal is described in Reference 1: Japanese Patent Laid-open No. 273603/1993. In this optical switch device, a first waveguide unit is provided on one surface of a liquid crystal panel having N rows and M columns and a second waveguide unit is provided on the other side. The first waveguide unit has N branching waveguides each having one input and M outputs, the branching waveguides being arranged such that the M output terminals of each branching waveguide are directed toward optical shutters in the column direction of the panel without overlap. In addition, the second waveguide unit has M condensing waveguides each having N inputs and one output, the condensing waveguides being arranged such that the N input terminals of each of these condensing waveguides are directed toward optical shutters in the row direction of the panel without overlap. This configuration can provide an optical switch device that, compared to the prior art, enables a greater reduction of crosstalk, facilitates packaging, and facilitates handling of wavelength division multiplexed optical signals.

An image display device that employs ON/OFF control of light by means of liquid crystal is described on page 52 of "Technology of Reflective Color Crystal Displays" (CMC BOOKS Co., Japan, 3-1999).

An optical switch network in which optical switches are used to switch optical signals is expected to serve as a means for realizing a high-capacity network that cannot be attained by a conventional electrical network. So far, optical switches that take advantage of the electro-optic effect or acousto-optic effect of crystals such as lithium niobate and optical switches that employ semiconductor optical amplifiers as gates have been designed, and various configurations have been proposed regarding optical switch networks that employ these components (for example, Reference 2: Japanese Patent Laid-open No. 197078/2000)

When an optical switch network is constituted using, for example, optical switches that employ the electro-optic effect and acousto-optic effect of crystals such as lithium niobate or optical switches that use semiconductor optical amplifiers as gates, the volume occupied by the optical switches alone becomes considerable as the number of switches in the optical switch network increases. For example, a 1000×1000 switch matrix by switches measuring one cm square would require a space measuring 10 m×10 m if the switches are arranged on a plane. Accordingly, the switch devices and the optical reception devices and optical switch network that include the switch devices, would result in an extremely bulky construction.

To overcome this problem, liquid crystal may be used to constitute the switch matrix. The use of liquid crystal enables a minimization of the area of switch units to several tens of μm, and, since the use of liquid crystal facilitates integration, a substantial reduction in the size of the switch matrix. The size of the optical reception devices and optical switch network can be reduced correspondingly.

The above example that indicates that liquid crystal can be used in an optical switch device accords with the prior art. Although the concept of using switches that are constituted by liquid crystal arranged in matrix form to switch optical paths is described in the optical switch device that is disclosed in Reference 1, nothing is disclosed regarding the actual construction that enables ON/OFF switching of the liquid crystal.

On the other hand, the element configuration that enables ON/OFF switching of liquid crystal in an image display device that uses liquid crystal is described on page 52 of the above-described "Technology of Reflective Color Liquid Crystal Displays" by CMC BOOKS Co. Still, no example exists that mentions the method of installing optical fiber in a liquid crystal optical shutter.

However, the portion in which an optical fiber is fitted to a liquid crystal shutter in an optical switch that uses liquid crystal is an important technical point that strongly influences overall performance. More specifically, the positional relation of each of the end portions of the pair of optical fibers on the input and output sides has a major bearing on performance.

First, it is important that the end surface (the contact surface of the end surface when the end surface is curved) of each optical fiber be mutually parallel. If the end surfaces are not parallel, the beam that is emitted from the optical fiber on the emitting side will not be directed precisely into the optical fiber on the input side, with the result that even though a beam is incident, the beam will not be precisely propagated in the input optical fiber, resulting in a large attenuation of light.

Second, it is important that the optical axes of the optical fibers be precisely aligned. If the optical axes are not aligned, the beam that is emitted from the optical fiber on the emitting side will not be directed precisely into the optical fiber on the input side.

Third, it is important that the two ends of the optical fibers be as close together as possible. The beam that is emitted from an optical fiber is diffused, and separation between the emitting end and input end therefore results in the input of only a portion of the emitted beam, resulting in significant attenuation.

When considering the installation of the input and output optical fibers in a liquid crystal display device of the prior art, solving the above-described first and second points has been problematic, but added to these two points, solving the third point has been insurmountable. This is because the substrate for encapsulating the liquid crystal in a normal liquid crystal display device is incorporated in the substrate for forming the liquid crystal driving circuits, and decreasing the gap between the two end portions is therefore difficult when the liquid crystal display device is installed between the input and output optical fibers.

SUMMARY OF THE INVENTION

It is an object of the present invention to provide the element configuration of a liquid crystal switch and a configuration of a liquid crystal switch device that, as the result of solving the above-described problem points, can switch any liquid crystal switch and moreover, can efficiently direct a beam that is emitted from the optical fiber on the emitting side to the optical fiber on the input side when the liquid crystal optical switch is ON, and accordingly, can reduce attenuation in the optical switch; and further, to provide an optical receiver and optical switch network that use this liquid crystal switch device.

The optical switch device of the present invention includes: a plurality of optical switches for ON/OFF switching of beams by means of voltage that is applied to liquid crystal; optical fibers that are installed on both sides of each optical switch; a voltage application switching element for switching the switches of the plurality of optical switches to which voltage is applied; a plurality of switching lines and voltage application lines that are disposed in rows and columns for applying voltage to the voltage application switching element; a driver for switching between applying or not applying voltage to the switching lines and voltage application lines; and a substrate on which optical switches are arranged that includes depressions that are formed for installing optical fibers.

In addition, each of the optical switches includes: a first electrode that is formed on the substrate on which the switching element is formed; a liquid crystal layer that is formed over the first electrode; a second electrode that is formed over the liquid crystal layer; and a plate that is formed over the second electrode; wherein depressions for installing optical fibers are formed in the plate.

The switching element is constituted by an element that includes at least one transistor.

Further, the switching element includes an optical switch that: is at least one field-effect transistor that is formed on a transparent substrate wherein a transparent electrode is connected to the source or drain of the field-effect transistor and wherein liquid crystal is contained between the transparent electrode and an opposing transparent electrode; and performs ON/OFF switching of light by means of ON/OFF switching of voltage that is applied between the transparent electrode and the opposing transparent electrode.

The optical switch network of the present invention is provided with: first to Sth (where $S \geq 2$) optical transmitter groups that are each constituted by first to Wth (where $W \geq 2$) optical transmitters for transmitting optical signals each having a different wavelength; first to Sth optical multiplexer/demultiplexers for receiving the W optical signals that are transmitted from the first to Sth optical transmitter groups, demultiplexing the wavelength division multiplexed optical signals in which W optical signals have been multiplexed, and outputting the result from WS (WS=W×S) output ports; and WS optical reception devices in which first to Sth optical gates are each connected to a different output port of the first to Sth optical multiplexer/demultiplexers. The optical reception devices in turn are characterized in that, in an optical reception device that includes:

a wavelength selection unit that is provided with at least an optical gate array for space selection that is composed of first to Sth (where $S \geq 2$) optical gates, a first-stage optical wavelength router for outputting each of the optical signals that are received from K0 input ports that are each connected to a respective optical gate of K0 (where K0=S) optical gates of the optical gate array for space selection from any of K1 (where $K1 \geq 2$) output ports according to wavelength, a first-stage optical gate array for wavelength selection that is composed of K1 optical gates that are each connected to a respective output port of the K1 output ports in the first-stage optical wavelength router, a second-stage optical wavelength router for outputting each of the optical signals that are received from the K1 input ports that are each connected to a respective optical gate of the K1 optical gates in the first-stage optical gate array for wavelength selection from any of K2 (where $K2 \geq 2$) output ports according to wavelength, and a second-stage optical gate array for wavelength selection that is composed of K2 optical gates that are each connected to a respective output port of the K2 output ports of the second-stage optical wavelength router;

an optical multiplexer for multiplexing the optical signals that have been received from the KR input ports that are each connected to a respective optical gate of the KR optical gates that make up the optical gate array for wavelength selection of the final stage R (where $R \geq 2$) of the wavelength selection unit; and an optical receiver for receiving optical signals that have been outputted from the optical multiplexer;

the first-stage gate array and second-stage gate array in the optical reception device include the above-described optical switch devices.

In addition, another optical switch network of the present invention is provided with: first to Sth (where $S \geq 2$) optical transmitter array groups that are each made up by first to Wth (where $W \geq 2$) optical transmitter arrays for transmitting optical signals of each of different wavelength groups, one group being V (where $V \geq 2$) wavelengths; first to Sth optical multiplexer/demultiplexers for receiving as input the W optical signals that are transmitted from the first to Sth optical transmitter array groups, demultiplexing wavelength division multiplexed optical signals in which W optical signals have been multiplexed, and outputting from WS (where WS=W×S) output ports; and WS optical reception devices in which the first to Sth optical gates are each connected to a different output port of the first to Sth optical multiplexer/demultiplexers.

The optical reception devices are characterized in that: in an optical reception device that includes:

a wavelength selection unit that is provided with at least: an optical gate array for space selection that is composed of first to Sth (where $S \geq 2$) optical gates, a first-stage optical wavelength router for outputting each of the optical signals that are received from K0 (where K0=S) input ports that are each connected to a respective optical gate of K0 optical gates of the optical gate array for space selection from any of K1 (where $K1 \geq 2$) output ports according to wavelength, a first-stage optical gate array for wavelength selection that is composed of K1 optical gates that are each connected to a respective output port of the K1 output ports in the first-stage optical wavelength router, a second-stage optical wavelength router for outputting each of optical signals that are received from the K1 input ports that are each connected to a respective optical gate of the K1 optical gates in the first-stage optical gate array for wavelength selection from any of K2 (where $K2 \geq 2$) output ports according to wavelength, and a second-stage optical gate array for wavelength selection that is composed of K2 optical gates that are each connected to a respective output port of the K2 output ports of the second-stage optical wavelength router;

an (R+1)th-stage optical wavelength router for outputting optical signals that are received from KR input ports that are each connected to a respective optical gate of the KR optical gates that constitute the optical gate array for wavelength selection in the final stage R (where $R \geq 2$) of the wavelength selection unit from any of V (where $V \geq 2$) output ports according to wavelength; and V optical receivers for receiving each of the optical signals that are outputted from the V output ports of the (R+1)th-stage optical wavelength router;

the first-stage gate array and second-stage gate array in the optical reception device include the above-described optical switch devices.

In addition, in an optical reception device that includes: an array optical selector that has N (where $N \geq 2$) paths in which M (where M≧2) paths can turn ON/OFF simultaneously as one path and that can perform selective ON/OFF switching of the N paths, a first-stage optical gate array that is composed of M optical gates that are each connected to a respective output port of the M output ports of the array optical selector, an optical wavelength router for outputting each of optical signals that are received from the M input ports that are each connected to a respective optical gate of the M optical gates that constitute the first-stage optical gate array from any of W (where W≧2) output ports according to wavelength, a second-stage optical gate array that is composed of W optical gates that are each connected to a respective output port of the optical wavelength router, an optical multiplexer for multiplexing and outputting optical signals that are outputted from the W optical gates that constitute the second-stage optical gate array, and an optical receiver for receiving the optical signals that are outputted from the optical multiplexer; the first-stage gate array and the second-stage gate array in the optical reception device include the above-described optical switch devices.

In addition, M may be made equal to W.

Further, another optical switch network of the present invention is provided with: first to Sth (where S=M×N) optical transmitter groups that are each composed of first to Wth (where W≧2) optical transmitters for transmitting optical signals of different wavelengths; first to Sth optical multiplexer/demultiplexers for receiving as input the W optical signals that are transmitted from the first to Sth optical transmitter groups, demultiplexing wavelength division multiplexed optical signals in which W optical signals have been multiplexed, and outputting from WS (where WS=W×S=W×M×N) output ports; and WS optical reception devices in which the first to Sth input ports are each connected to a different output port of the first to Sth optical multiplexer/demultiplexers. The optical reception devices are characterized in that: in an optical reception device that includes:

a wavelength selection unit that is provided with at least an array optical selector that has N (where N≧2) paths in which M (where M≧2) paths can turn ON/OFF simultaneously as one path and that can perform selective ON/OFF switching of the N paths, an optical gate array for space selection that is composed of M optical gates that are each connected to a respective output port of the M output ports of the array optical selector, a first-stage optical wavelength router for outputting each of optical signals that are received from the K0 (where K0=M) input ports that are each connected to a respective optical gate of the K0 optical gates of the optical gate array for space selection from any of K1 (where K1≧2) output ports according to wavelength, a first-stage optical gate array for wavelength selection that is composed of K1 optical gates that are each connected to a respective output port of the K1 output ports in the first-stage optical wavelength router, a second-stage optical wavelength router for outputting each of optical signals that are received from the K1 input ports that are each connected to a respective optical gate of the K1 optical gates in the first-stage optical gate array for wavelength selection from any of K2 (where K2≧2) output ports according to wavelength, and a second-stage optical gate array for wavelength selection that is composed of K2 optical gates that are each connected to a respective output port of the K2 output ports of the second-stage optical wavelength router;

an optical multiplexer for multiplexing and outputting optical signals that are received from KR input ports that are each connected to a respective optical gate of KR optical gates that constitute the optical gate array for wavelength selection of the final stage R (where R≧2) of the wavelength selection unit; and an optical receiver for receiving the optical signals that are outputted from the optical multiplexer;

the first-stage gate array and second-stage gate array in the optical reception device include the above-described optical switch devices.

Further, another optical switch network of the present invention is provided with: first to Sth (where S≧2) optical transmitter array groups that are each composed of first to Wth (where W≧2) optical transmitter arrays for transmitting optical signals of different wavelength groups in which V (where V≧2) wavelengths are one group; first to Sth optical multiplexer/demultiplexers for receiving as input the W optical signals that are transmitted from the first to Sth optical transmitter array groups, demultiplexing the wavelength division multiplexed optical signals in which W optical signals have been multiplexed, and outputting from WS (where WS=W×S=W×M×N) output ports; and WS optical reception devices in which the first to Sth input ports are each connected to a different output port of the first to Sth optical multiplexer/demultiplexers. The optical reception devices are characterized in that, in an optical reception device that includes:

a wavelength selection unit that is provided with at least: an array optical selector that has N (where N≧2) paths in which M (where M≧2) paths can turn ON/OFF simultaneously as one path and that can perform selective ON/OFF switching of the N paths, an optical gate array for space selection that is composed of M optical gates that are each connected to a respective output port of the M output ports of the array optical selector, a first-stage optical wavelength router for outputting each of optical signals that are received from the K0 (where K0=M) input ports that are each connected to a respective optical gate of the K0 optical gates of the optical gate array for space selection from any of K1 (where K1≧2) output ports according to wavelength, a first-stage optical gate array for wavelength selection that is composed of K1 optical gates that are each connected to a respective output port of the K1 output ports in the first-stage optical wavelength router, a second-stage optical wavelength router for outputting each of optical signals that are received from K1 input ports that are each connected to a respective optical gate of the K1 optical gates in the first-stage optical gate array for wavelength selection from any of K2 (where K2≧2) output ports according to wavelength, and a second-stage optical gate array for wavelength selection that is composed of K2 optical gates that are each connected to a respective output port of the K2 output ports of the second-stage optical wavelength router;

an (R+1)th-stage optical wavelength router for outputting optical signals that are received from KR input ports that are each connected to a respective optical gate of the KR optical gates that constitute the optical gate array for wavelength selection of the final stage R (where R≧2) of the wavelength selection unit from any of V (where V≧2) output ports according to wavelength; and V optical receivers for receiving each of the optical signals that are outputted from the V output ports in the (R+1)th-stage optical wavelength routers; the first-stage gate array and second-stage gate array in the optical reception device include the above-described optical switch devices.

In addition, the numbers K1-KR of optical gates in the above-described first-stage to Rth-stage optical gate arrays are prime numbers or 4.

Application of the present invention allows implementation of an element configuration of a liquid crystal switch and a constitution of a liquid crystal switch device, and moreover, an optical reception device and optical switch network that employ the liquid crystal switch device, that can switch any liquid crystal switch, and moreover, that, when a liquid crystal optical switch is turned ON, can efficiently direct the beam that is emitted from the optical fiber on the emitting side into the optical fiber on the input side, and thus reduce attenuation in an optical switch.

The above and other objects, features, and advantages of the present invention will become apparent from the following description based on the accompanying drawings, which illustrate examples of preferred embodiments of the present invention.

BRIEF DESCRIPTION OF THE DRAWINGS

FIG. 3 is schematic circuit diagram 2 showing the vicinity of one optical switch in the optical switch device of the present invention.

FIG. 7 is schematic section 1 showing the method of fabricating the optical switch device of the present invention.

FIG. 12 is schematic section 6 showing the method of fabricating the optical switch device of the present invention.

FIG. 22 shows the wavelength transmission characteristic of an optical wavelength router in the fourth optical switch network.

FIG. 23 shows the wavelength transmission characteristic of an optical wavelength router in the fourth optical switch network.

FIG. 24 shows the wavelength transmission characteristic of an optical wavelength router in the fourth optical switch network.

FIG. 30 shows the wavelength transmission characteristic of an optical wavelength router in the fifth optical switch network.

FIG. 31 shows the wavelength transmission characteristic of an optical wavelength router in the fifth optical switch network.

FIG. 33 is a block diagram showing the configuration of an optical selector in the sixth optical switch network.

FIG. 34 is an outer perspective view showing the configuration of an array optical gate in the sixth optical switch network.

FIG. 35 shows the wavelength transmission characteristic of an optical wavelength router in the sixth optical switch network.

FIG. 38 shows the wavelength transmission characteristic of an optical wavelength router in the seventh optical switch network.

DETAILED DESCRIPTION OF THE PREFERRED EMBODIMENTS

Explanation first regards the configuration of the optical switch device of the present invention.

Figure 1:
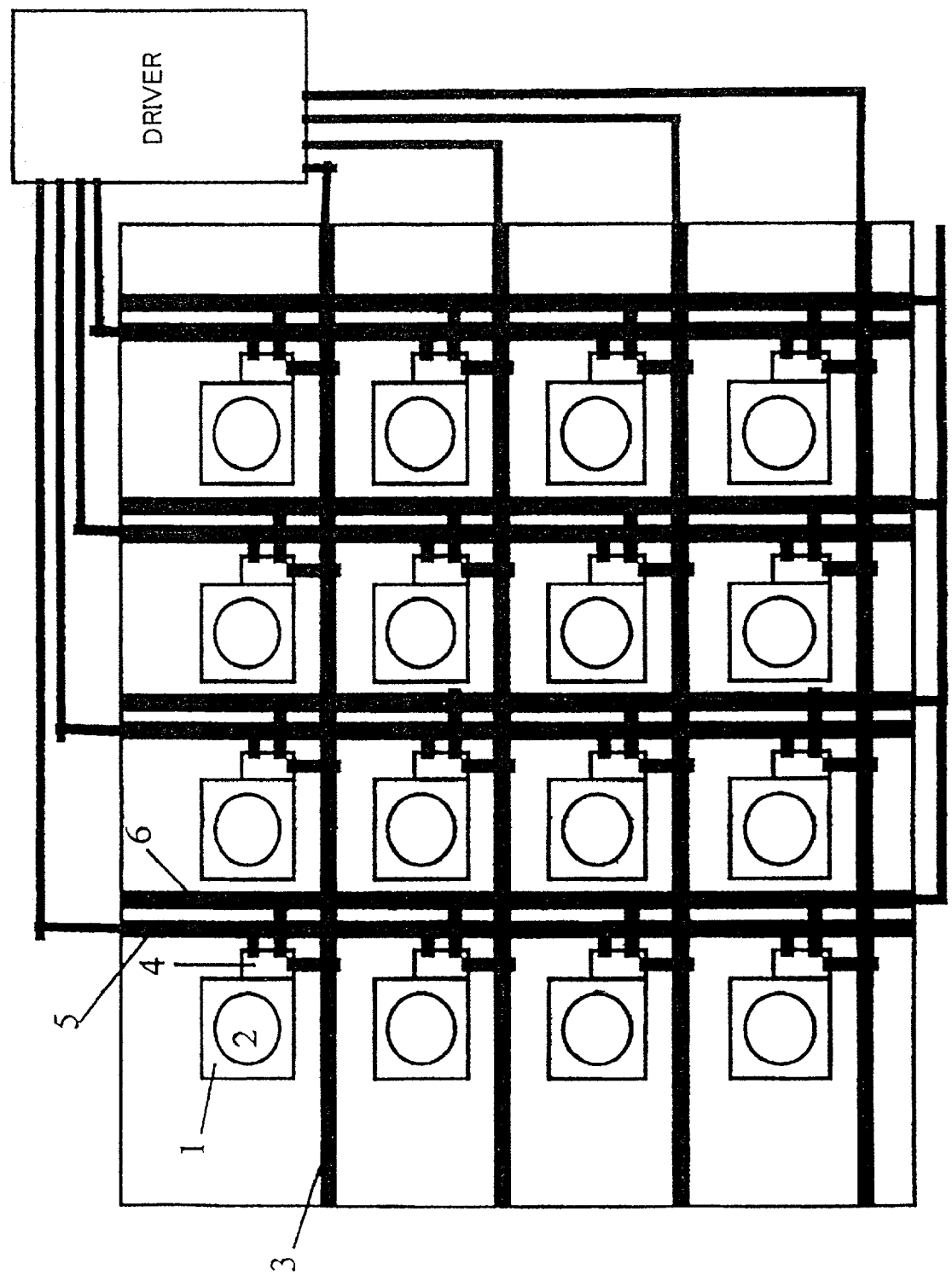
FIG. 1 is a schematic plan view showing the optical switch device of the present invention.

We first refer to FIG. 1, in which is shown an overhead view of the representative configuration of an optical switch of the present invention. A total of 16 liquid crystal units 1 are arranged in four rows and four columns, switching element 4 being arranged in each liquid crystal unit 1 for voltage-driving the element. Optical fiber 2 is installed in a direction that is perpendicular to the figure (perpendicular to the paper surface) on each liquid crystal unit 1. Although not visible in the figure, another optical fiber is installed below each liquid crystal unit 1. Four first switching lines 3 are arranged in the horizontal direction in the figure, and four second switching lines 5 and four ground lines 6 are arranged in the vertical direction of the figure. Each of the switching elements is connected to first switching line 3, second switching line 5, and ground line 6 as shown in the figure. Although not shown in the figure, one of a pair of electrodes that is included in each liquid crystal unit 1 is connected to ground line 6 and the other of the pair of electrodes is connected to switching element 4.

In this configuration, selecting and applying voltage to any first switching line and second switching line 5 drives the switching element that is located at the intersection of the two lines and thus applies voltage to the liquid crystal and thereby switch the orientation of the liquid crystal. Liquid crystal unit 1 that did not transmit light when voltage was not applied thereby transmits light, and optical fibers that are located above and below liquid crystal unit 1 can transmit light.

Lines that are maintained at any fixed voltage may be used in place of ground lines 6. Alternatively, a capacitor for holding voltage may be provided between each switching element 4 and ground line 6. A light conductor other than optical fiber may also be used in place of optical fiber 2. Although a case is here shown in which liquid crystals and optical fibers were arranged in four rows and four columns, the number of rows and columns may be selected as appropriate according to necessity.

Figure 2:
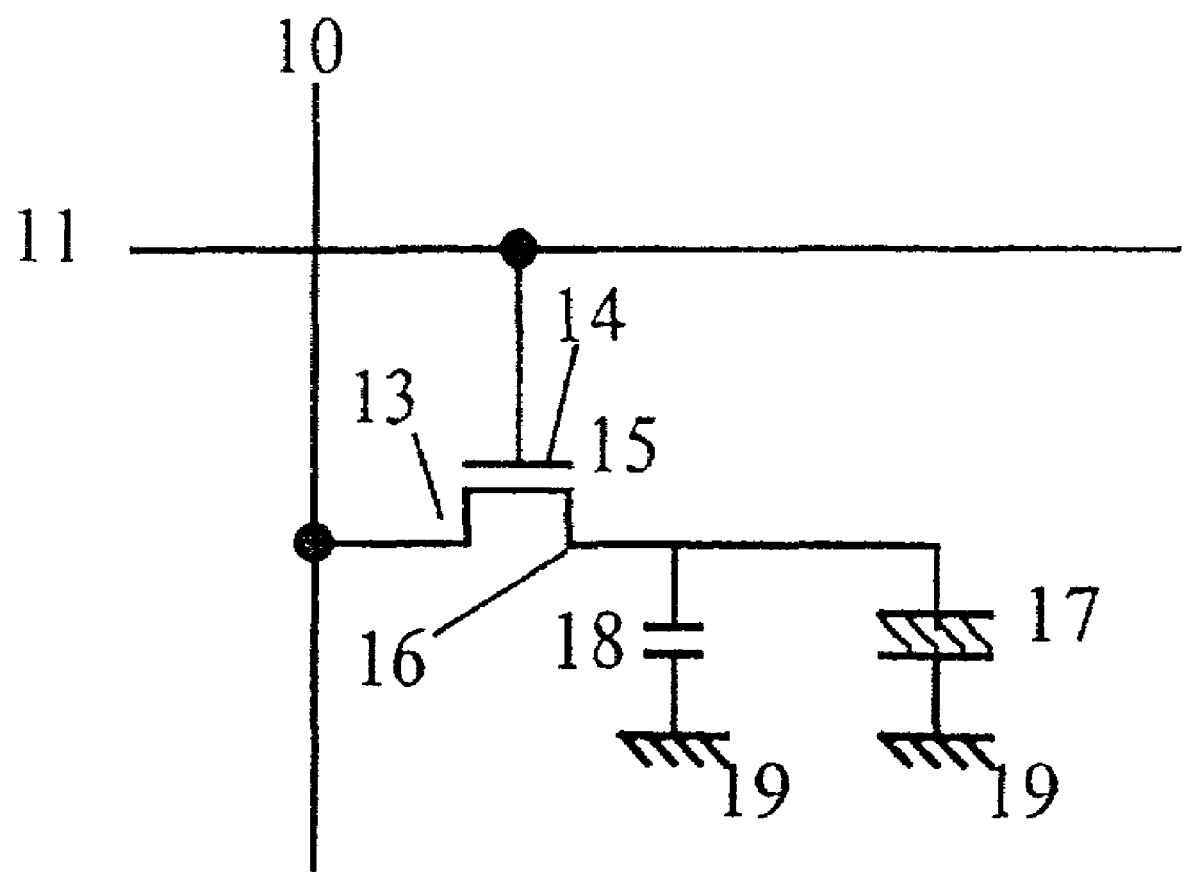
FIG. 2 is schematic circuit diagram 1 showing the vicinity of one optical switch in the optical switch device of the present invention.

FIG. 2 shows the circuit structure in the vicinity of one liquid crystal unit. Voltage application line (data line) 10 and switching line (gate line) 11 are provided so as to intersect. Source 13 of switching transistor 15 is connected to voltage application line 10, and gate 14 is connected to switching line 11. Drain 16 of switching transistor 15 is connected to one of the electrodes of voltage holding capacitor 18 and one of the electrodes of liquid crystal unit 17. The other electrodes of voltage holding capacitor 18 and liquid crystal unit 17 are connected to ground 19.

Any constant-voltage supply may be used in place of ground 19.

FIG. 3(*a*) shows a case in which the portion shown as ground in FIG. 2 is represented as a ground line. A line to which a constant voltage is applied may be used in place of a ground line.

FIG. 3(*b*) shows a case in which the switching line and ground line in FIG. 3(*a*) are combined, switching line 12 also serving as ground line. A switching line that also serves as a constant-voltage line is also possible.

Figure 4:
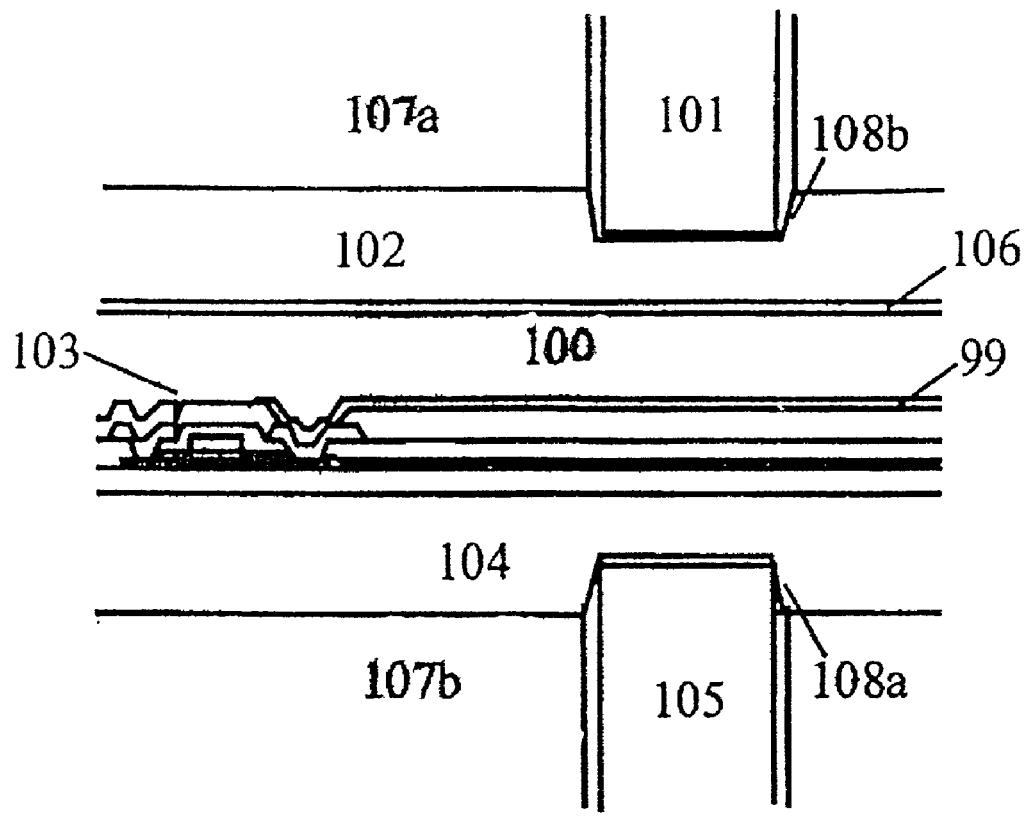
FIG. 4 is schematic section 1 showing the vicinity of one optical switch in the optical switch device of the present invention.

FIG. 4 is a schematic sectional view of an element showing the vicinity of one liquid crystal unit. Switching transistor 103 is formed over transparent substrate 104, and lower electrode 99 is connected to switching transistor 103. Liquid crystal 100 is formed over lower electrode 99, and upper electrode 106 and liquid crystal encapsulation glass 102 are successively formed over this liquid crystal 100.

Optical fiber introduction hole 108*b* formed in the liquid crystal encapsulation glass 102 is formed in the upper portion of liquid crystal encapsulation glass 102. The side surfaces of optical fiber introduction hole 108*b* are processed to a tapered form. First optical fiber 101 is installed in optical fiber introduction hole 108*b*. Optical fiber introduction hole 108*a* formed in the transparent substrate 104 is formed in the lower portion of transparent substrate 104. The side surfaces of optical fiber introduction hole 108*a* are processed to a tapered form. Second optical fiber 105 is installed in optical fiber introduction hole 108*a*. Guide 107*a*, which has a hole until first optical fiber 101 is installed in optical fiber introduction hole 108*b*, is provided over liquid crystal encapsulation glass substrate 102, and guide 107*b*, which has a hole until second optical fiber 105 is installed in optical fiber introduction hole 108*a*, is provided below transparent substrate 104.

In this configuration, performing switching of switching transistor 103 enables switching of the voltage between lower electrode 99 and upper electrode 106, thereby enabling switching of the orientation of liquid crystal 100. Orientation is typically set such that light can be transmitted vertically when voltage is applied and light is not transmitted when voltage is not applied. The path of a beam between first optical fiber 101 and second optical fiber 105 can thus be switched ON and OFF.

Optical fibers 101 and 105 are installed in optical fiber introduction holes 108*b* and 108*a*, respectively, these fibers being guided to positional coordinates that are determined by the tapered form. As a result, the end surfaces of optical fiber 101 and optical fiber 105 can be maintained parallel to each other, and at the same time, the optical axes of the two optical fibers can be precisely aligned. The installation of the optical fibers in holes that are provided in the substrate in this configuration allows the end surfaces of the two optical fibers to be brought into closer proximity than in a configuration that lacks holes. These effects of this configuration can reduce the loss of light that occurs between the end surfaces of the fibers when the liquid crystal is caused to transmit light (is switched to the ON state).

Figure 5:
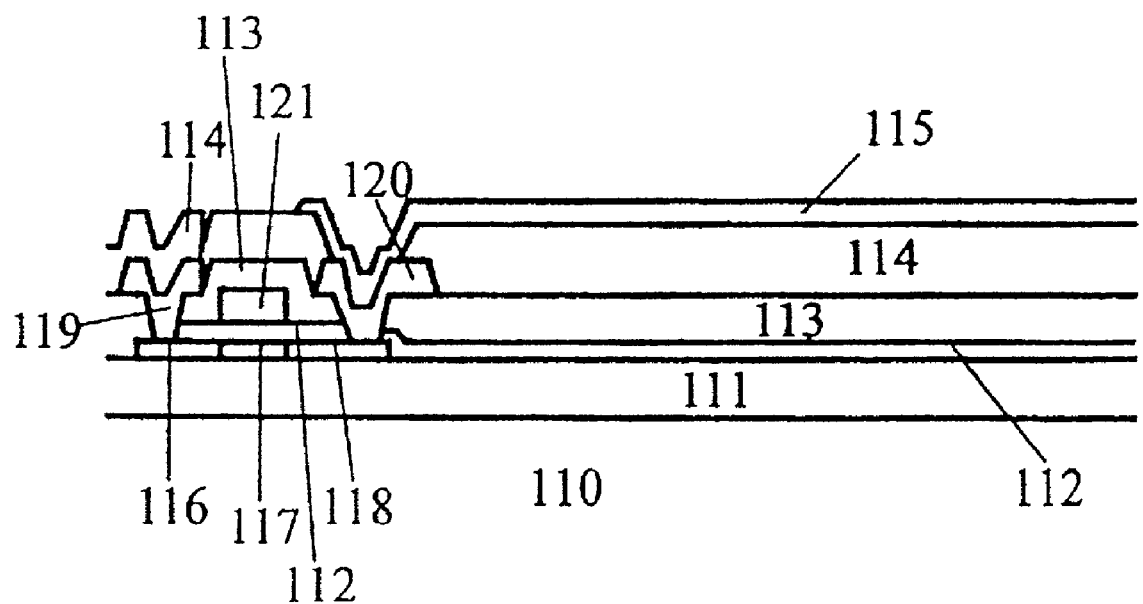
FIG. 5 is schematic section 2 showing the vicinity of one optical switch in the optical switch device of the present invention.

FIG. 5 is a sectional view that shows in greater detail the construction of the vicinity of the switching transistor that can be applied in the present invention. Barrier layer 111 is formed over transparent substrate 110. Channel region (gate) 117, source 116, and drain 118 of a thin-film transistor (TFT) are formed over this barrier layer 111, as shown in the figure. Gate insulation film 112 is formed over this TFT. A hole is formed in this gate insulation film 112 in the portion that is located over source 116 and drain 118 of the TFT. Gate electrode 121 is formed in the portion that is located over both the gate insulation film 112 and channel region 117 of the TFT. Gate electrode 121 is connected to wiring (not shown in the figure). First interlayer dielectric film 113 is formed over this construction, but holes are opened in the portions that are located over source 116 and drain 118. Source electrode 119 and drain electrode 120 are formed in these hole portions such that source electrode 119 contacts source 116 and drain electrode 120 contacts drain 118. Second interlayer dielectric film 114 is then formed over this structure with the exception of the portion over drain electrode 120 as shown in the figure. Although not shown here, source electrode 119 is connected to the switching element. The pattern of lower electrode 115 is then formed over this structure such that lower electrode 115 contacts drain electrode 120, and liquid crystal (not shown in the figure) is formed over the pattern of lower electrode 115.

Figure 6:
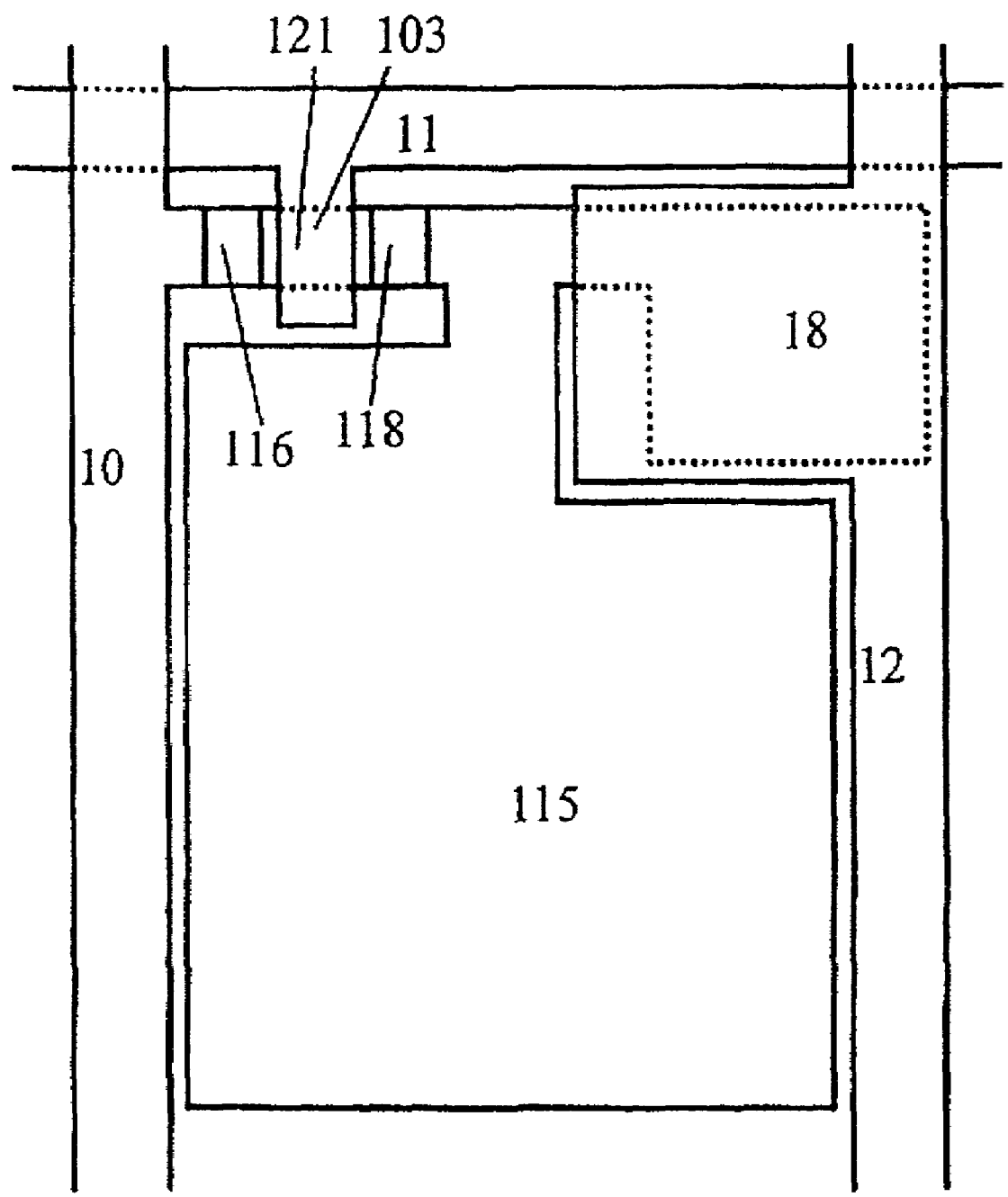
FIG. 6 is a schematic plan view showing the vicinity of one optical switch in the optical switch device of the present invention.
Figure 8:
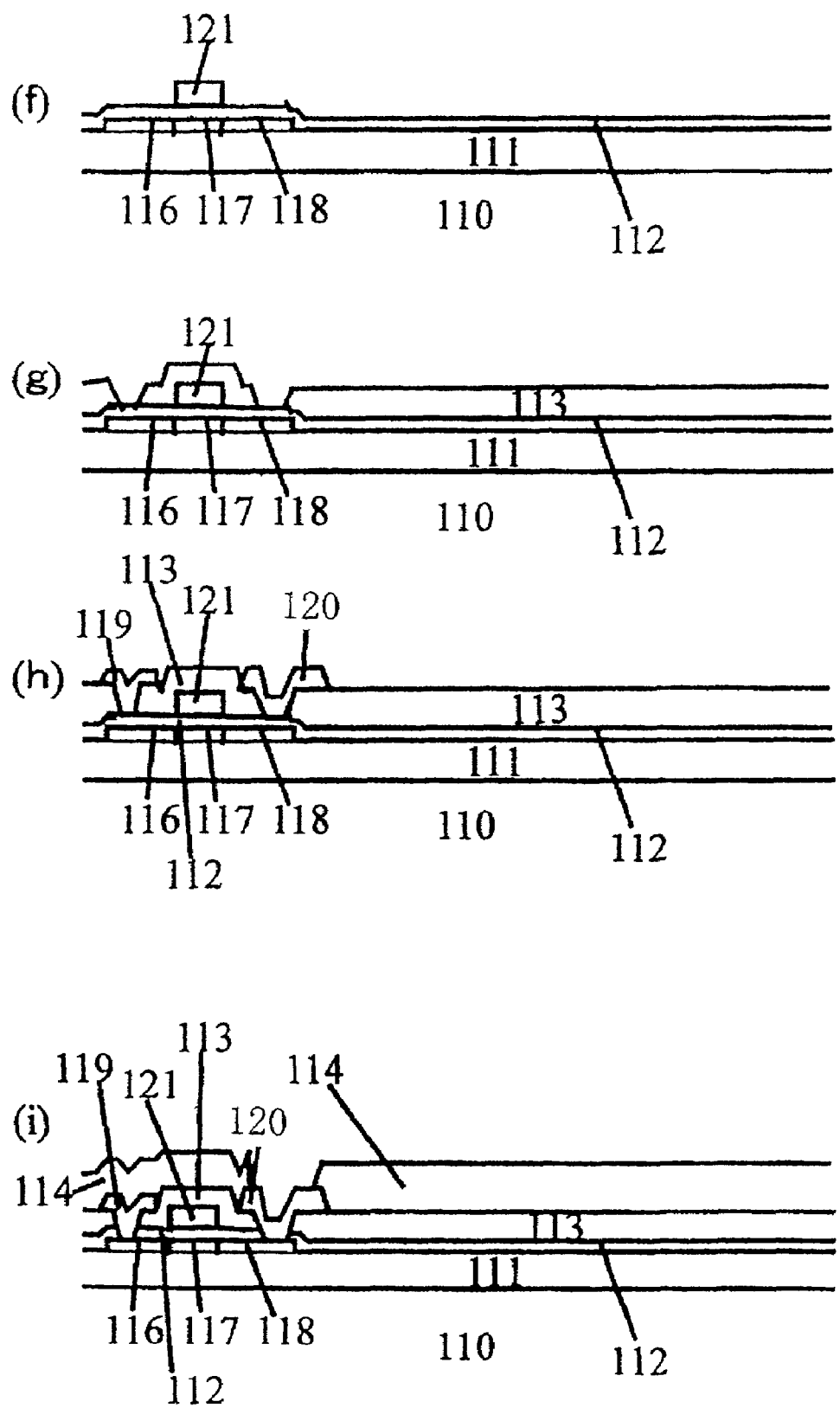
FIG. 8 is schematic section 2 showing the method of fabricating the optical switch device of the present invention.
Figure 9:
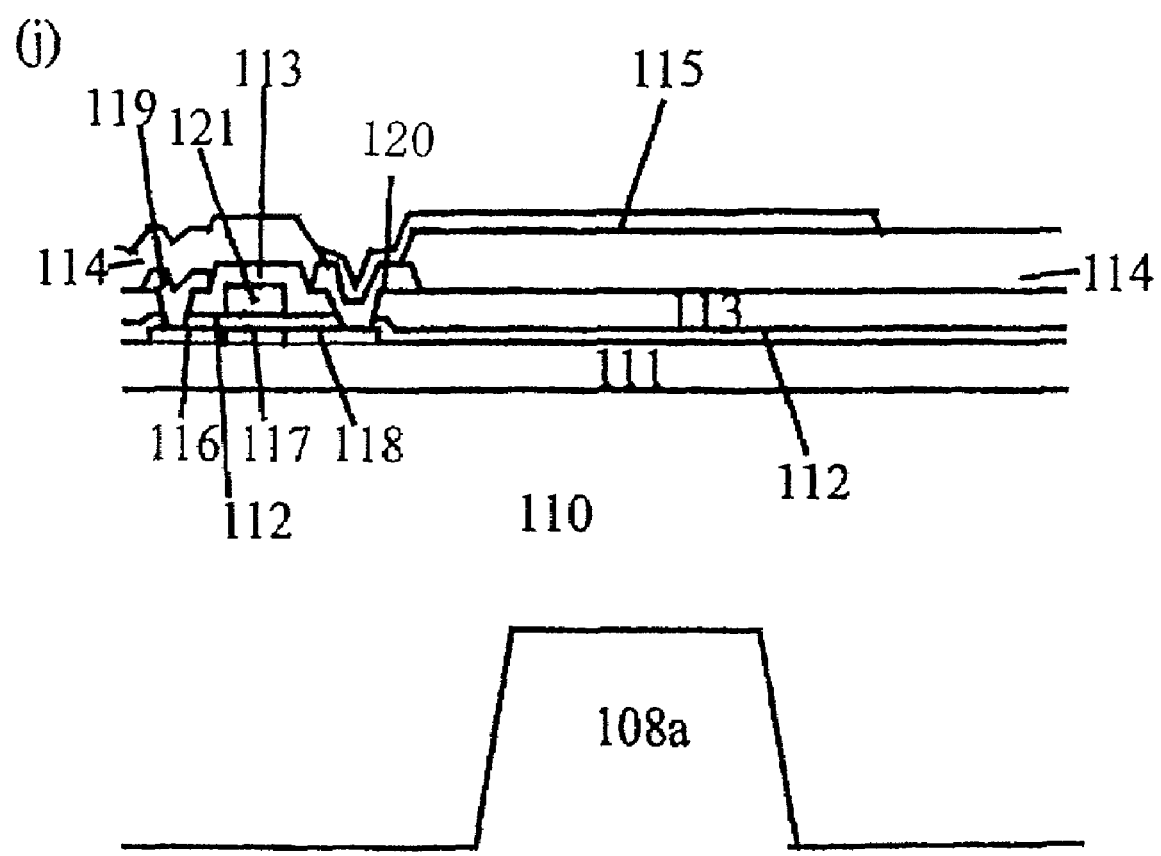
FIG. 9 is schematic section 3 showing the method of fabricating the optical switch device of the present invention.
Figure 10:
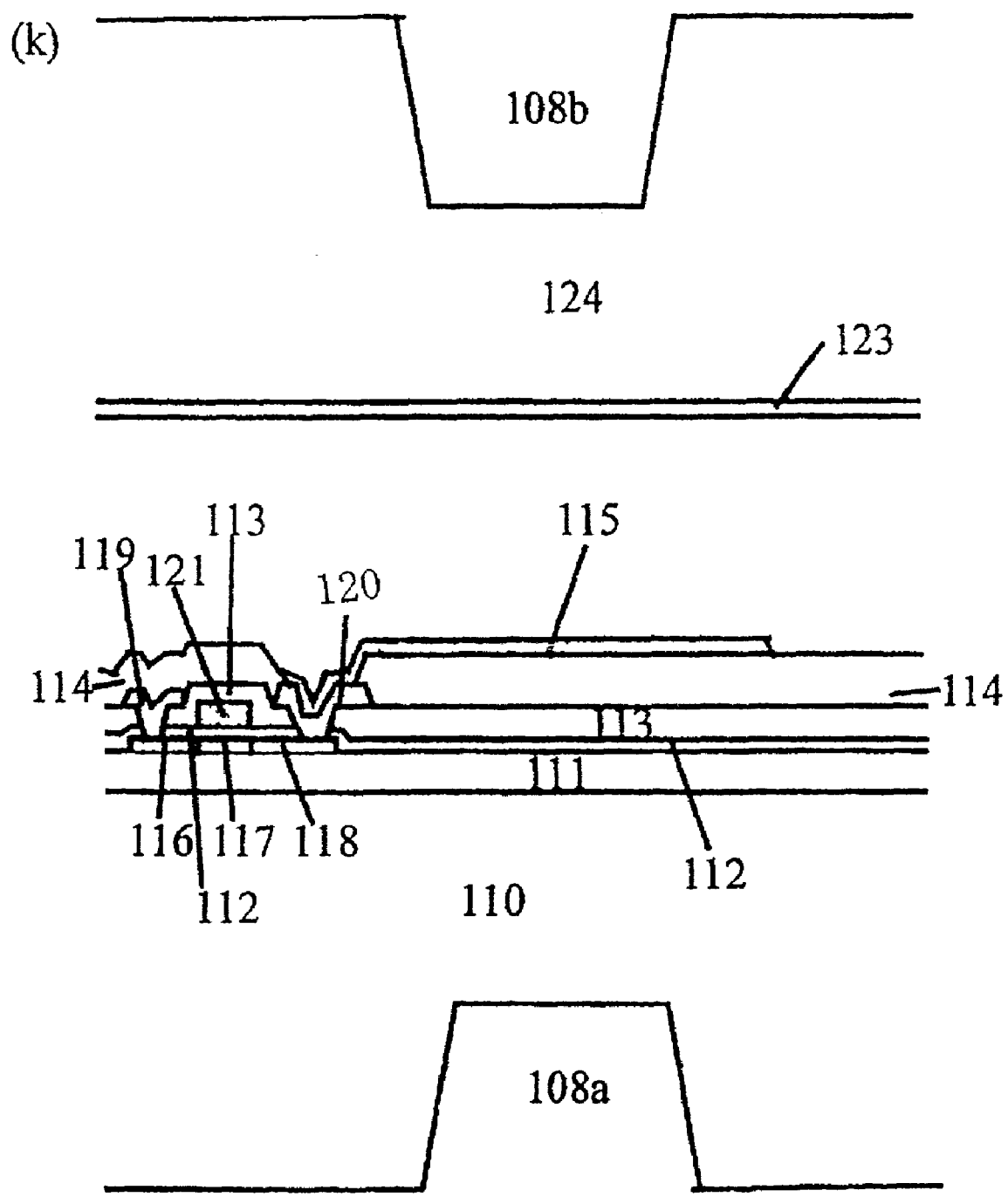
FIG. 10 is schematic section 4 showing the method of fabricating the optical switch device of the present invention.
Figure 11:
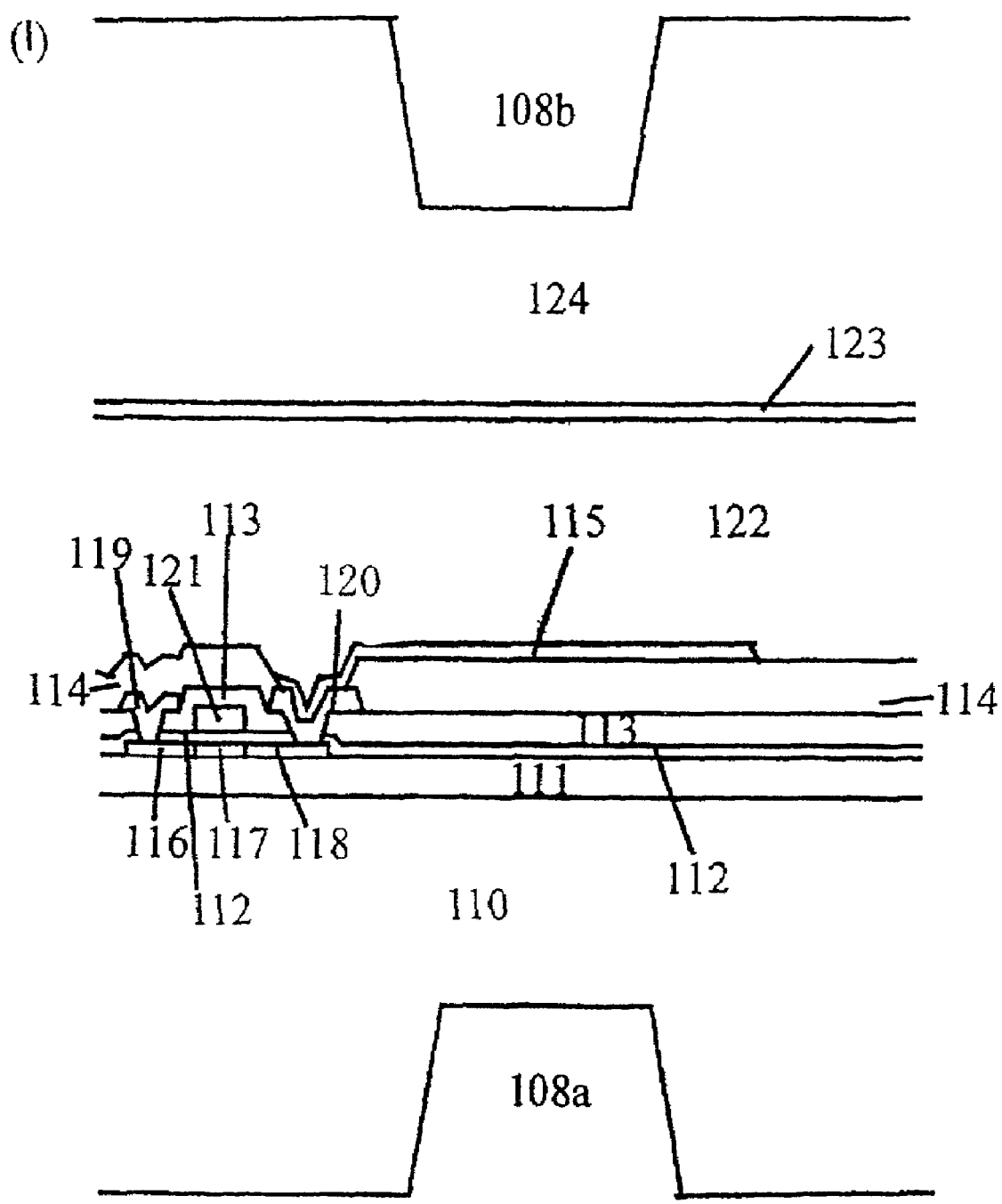
FIG. 11 is schematic section 5 showing the method of fabricating the optical switch device of the present invention.

FIG. 6 is a typical plan view of the vicinity of the liquid crystal that includes the wiring parts for a case of application of an element having the sectional structure shown in FIG. 4 and FIG. 5. Switching line (gate line) 11 is connected to gate electrode 121 of switching transistor 103. Voltage application line (data line) 10 is connected to source 116 of switching transistor 103. Drain 118 of switching transistor 103 is connected to lower electrode 115 as well as to one of the terminals (the lower surface of capacitor 18 in the figure) of voltage holding capacitor 18 that is formed between the TFT and ground line 12. The other terminal (the upper surface of capacitor 18 in the figure) of voltage-holding capacitor 18 is connected to ground line 12.

The following materials can be used for each of the parts that constitute the liquid crystal switch device:

| Substrate | Glass, Resin, Quartz |
|---|---|
| Lower electrode layer | ITO (Indium Tin Oxide), a mixture of an indium oxide and a zinc oxide |
| Upper electrode layer | ITO (Indium Tin Oxide), a mixture of an indium oxide and a zinc oxide |
| Switching lines, Voltage application lines, Second switching lines, Common lines, Ground lines | Aluminum, copper, tantalum, ruthenium, tungsten silicide |
| Source—drain electrodes, Gate electrodes | Aluminum, copper, tantalum, ruthenium, tungsten silicide |
| Gate insulation film, First interlayer dielectric film, Barrier layer | Aluminum oxide, aluminum nitride, silicon oxide, silicon nitride, or a mixture of these materials |
| Second interlayer dielectric film | Aluminum oxide, aluminum nitride, silicon oxide, silicon nitride, or a mixture of these materials; a resin such as an acrylic resin |
| Liquid crystal | Nematic liquid crystal, dielectric liquid crystal |

Referring now to FIGS. 7–13, representative fabrication methods of the luminous elements in which the present invention has been applied (the structure shown in FIG. 5) are next described.

Substrate 110 such was first prepared as shown in FIG. 7(a). Optical fiber introduction hole 108a was formed in advance in substrate 110. Typically, substrate 110 is non-alkaline glass. As shown in FIG. 7(b), barrier layer 111 is formed on this substrate by a sputtering or CVD (chemical vapor deposition) method. Silicon 130 is then formed over this barrier layer 111 as shown in FIG. 7(c) by a sputtering or CVD method, or typically, by a LP (low-pressure) CVD method in which a temperature of approximately 500° C. is applied, and then polycrystallized by irradiation by laser. Gate insulation film 112 is next formed by sputtering or CVD as shown in FIG. 7(d). Typically, a silicon dioxide film is grown by a remote plasma CVD method. The pattern of gate electrode 121 is next formed over this gate insulation film as shown in FIG. 7(e). The gate electrode pattern is formed by first growing a gate electrode film, typically by sputtering or evaporation from, for example, tungsten silicide (WSi), applying a photoresist over this gate electrode film by means of spin-coating, patterning the photoresist by exposure using an optical mask and development, eliminating the gate electrode film of the portion in which there is no photoresist pattern by milling, and finally, removing the photoresist by a method such as dissolving in a solvent. Areas other than the silicon formation portion are next covered with resist, following which source 116 and drain 118 are formed by ion-doping with boron or phosphorus, as shown in FIG. 8(f). Source 116 and drain 118 are typically activated by carrying out a heat treatment at a temperature of approximately 550° C. Next, as shown in FIG. 8(g), first interlayer dielectric film 113 is formed, typically from silicon dioxide (SiO2) by a sputtering or CVD method, following which the gate insulation film and first interlayer dielectric film that were formed in the source and drain portions are removed. At this time, the same method that was used for the above-described patterning of gate electrode 121 may be employed. Next, as shown in FIG. 8(h), the patterns for source electrode 119 and drain electrode 120 are formed, typically from aluminum. The method used in the above-described patterning of gate electrode 121 may also be employed here. Second interlayer dielectric film pattern 114 is next formed, typically of acrylic resin, as shown in FIG. 8(i). The method that was used in the above-described patterning of gate electrode 121 may also be employed here. The pattern of lower electrode (transparent electrode) 115 is next formed as shown in FIG. 9(j). The method that was used in the above-described patterning of gate electrode 121 may also be employed here.

Next, as shown in FIG. 10(k), liquid crystal encapsulation glass 124 on which upper electrode 123 has been formed is installed over these patterns. Optical fiber introduction hole 108b has been formed in advance on the upper portion of liquid crystal encapsulation glass 124. Next, liquid crystal is injected between upper electrode 123 and lower electrode 115 to form liquid crystal layer 122 as shown in FIG. 11(l).

Figure 13:
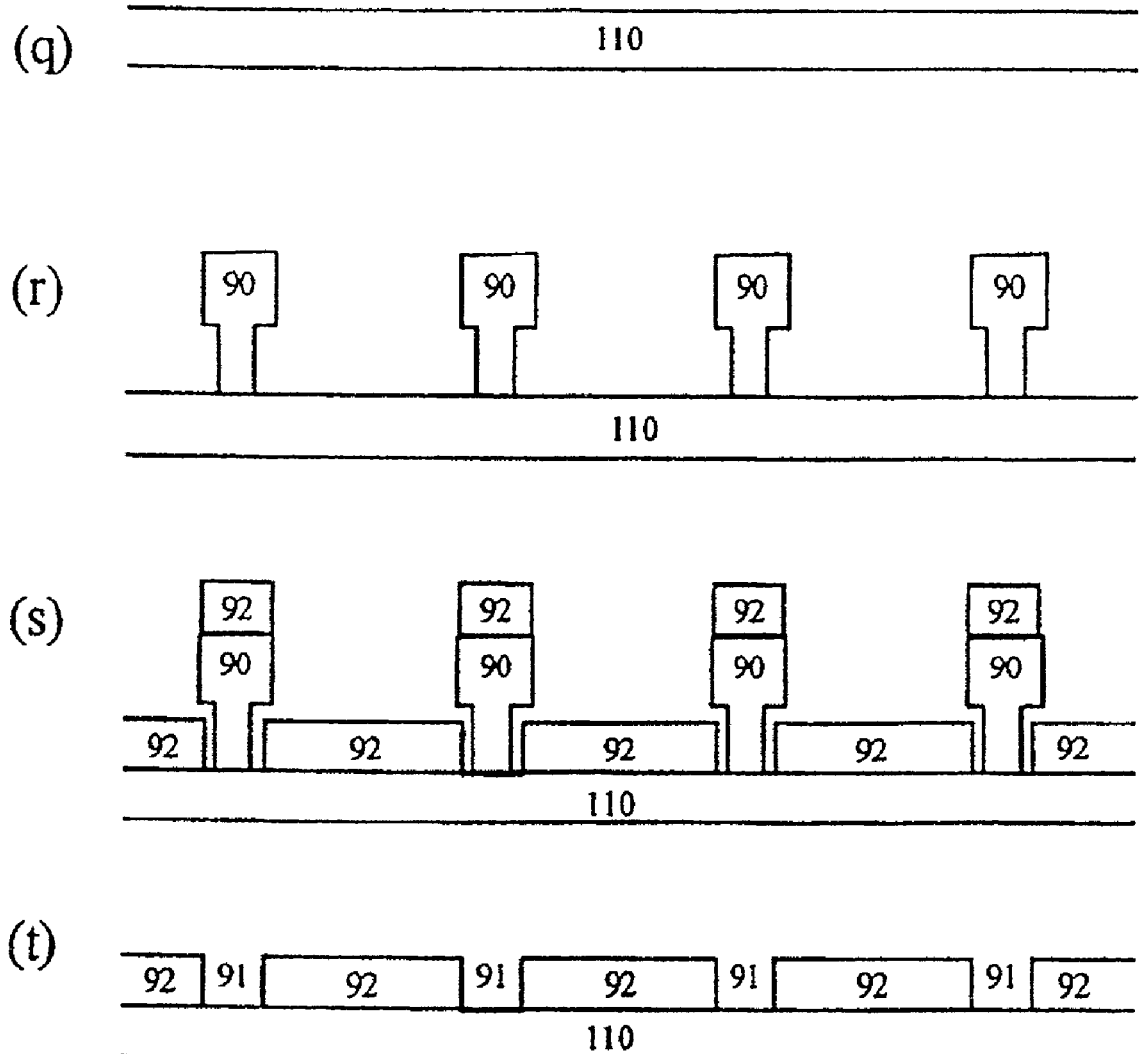
FIG. 13 is schematic section 7 showing the method of fabricating the optical switch device of the present invention.

The method of forming holes in transparent substrate 110 is next explained with reference to FIGS. 12 and 13.

In the first method, photoresist 90 is formed as shown in FIG. 12(n) on a substrate that has been prepared as shown in FIG. 12(m). Next, depressions are formed in substrate 110 by etching as shown in FIG. 12(o). As the type of etching, milling by directing particles against the surface in a vacuum to physically grind the surface is typical, but RIE (Reactive Ion Etching) that uses a selectively reactive substance or chemical etching in an aqueous solution are also candidates. Photoresist 90 is next removed as shown in FIG. 12(p) by dissolving the photoresist in a solvent or by reactive etching or ashing that is selective with respect to the photoresist.

In the second method, substrate 110 is prepared as shown in FIG. 13(q), and photoresist 90 is then formed on substrate 110 as shown in FIG. 13(r). Transparent laminate 92 is formed over this photoresist 90 as shown in FIG. 13(s). Photoresist 90 is next removed as shown in FIG. 13(t) by dissolving the photoresist in a solvent or by reactive etching or ashing that is selective with respect to the photoresist. Substrate 110 and transparent laminate 92 are together considered as a single substrate in which depressions 91 are formed.

Examples are next presented in which the liquid crystal switch device having the construction shown in FIGS. 1 to 6 is applied to an optical reception device and an optical switch network.

First Optical Switch Network

Figure 14:
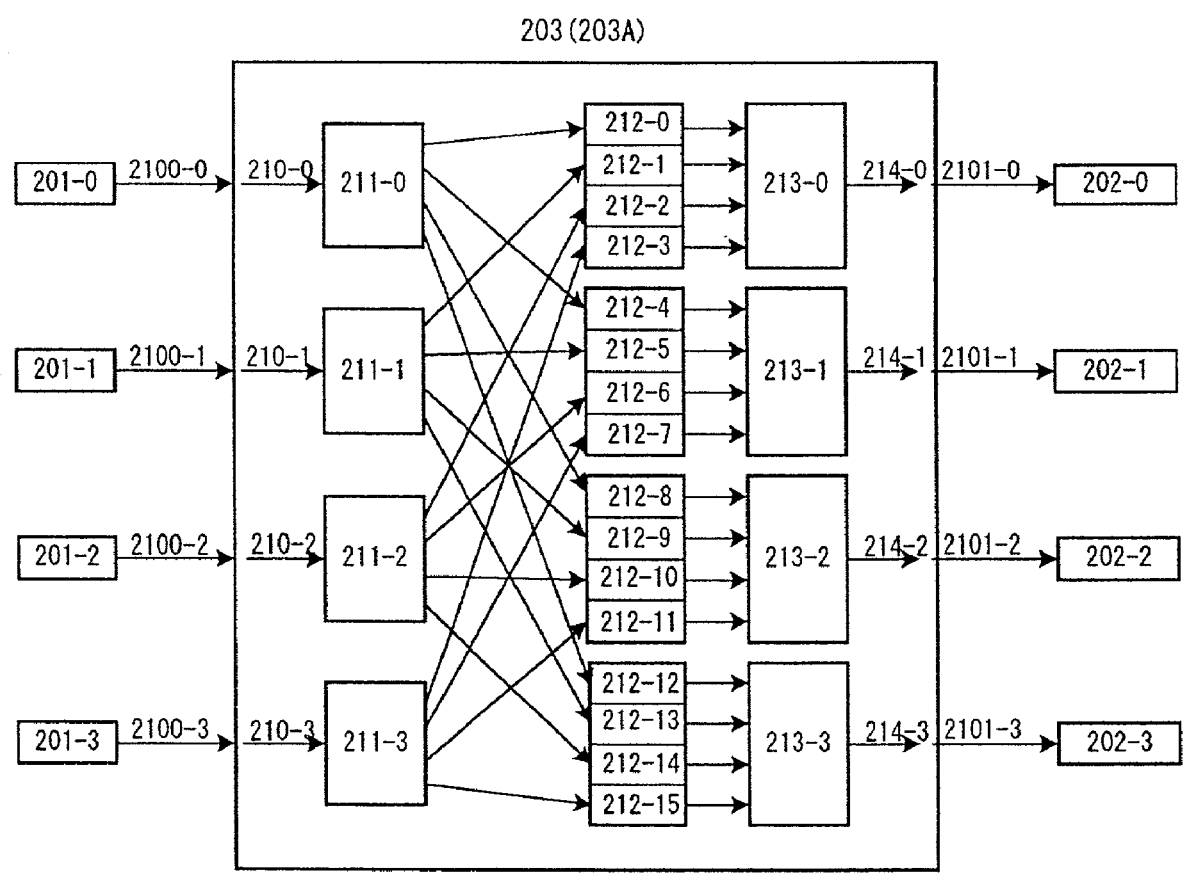
FIG. 14 is a block diagram showing the configuration of the first optical switch network.

FIG. 14 is a block diagram of an optical switch network in which the optical switch device of the present invention is applied. FIG. 14 shows a 4×4 optical switch network in which optical signals that are transmitted from transmission nodes 201 pass through optical fibers 2100 to be received at optical switch device 203 (203A), the optical signals that have been switched by optical switch device 203A then passing through optical fibers 2101 to be received by reception nodes 202.

In optical switch device 203A, optical signals that are received from input ports 210 are demultiplexed by optical demultiplexers 211 and then applied to four optical gates 212. Optical gates 212 are liquid crystal and transmit the optical signals when voltage is applied and the optical gates are in an ON state but block optical signals when current is not allowed to flow and the optical gates are in the OFF state. The four optical gates 212 are connected to four optical multiplexers 213. ON/OFF control of optical gates 212 enables connection between any input port 210 and output port 214.

For example, turning ON optical gate 212-4 allows an optical signal that has been received from input port 210-0 to be outputted from output port 214-1. Optical switch device 203A is a crossbar switch in which a unique path exists for any combination of input port 210 and output port 214. Optical gates 212 correspond to crosspoints, and since optical gates 212 that are to be turned ON can be uniquely determined once the input port 210 and output port 214 that are to be connected have been designated, the control logic is simple. In addition, since a crossbar switch is absolutely nonblocking, conflict control is unnecessary except for cases in which different input ports 210 are to be connected to the same output port 214 at the same time.

Second Optical Switch Network

Figure 15:
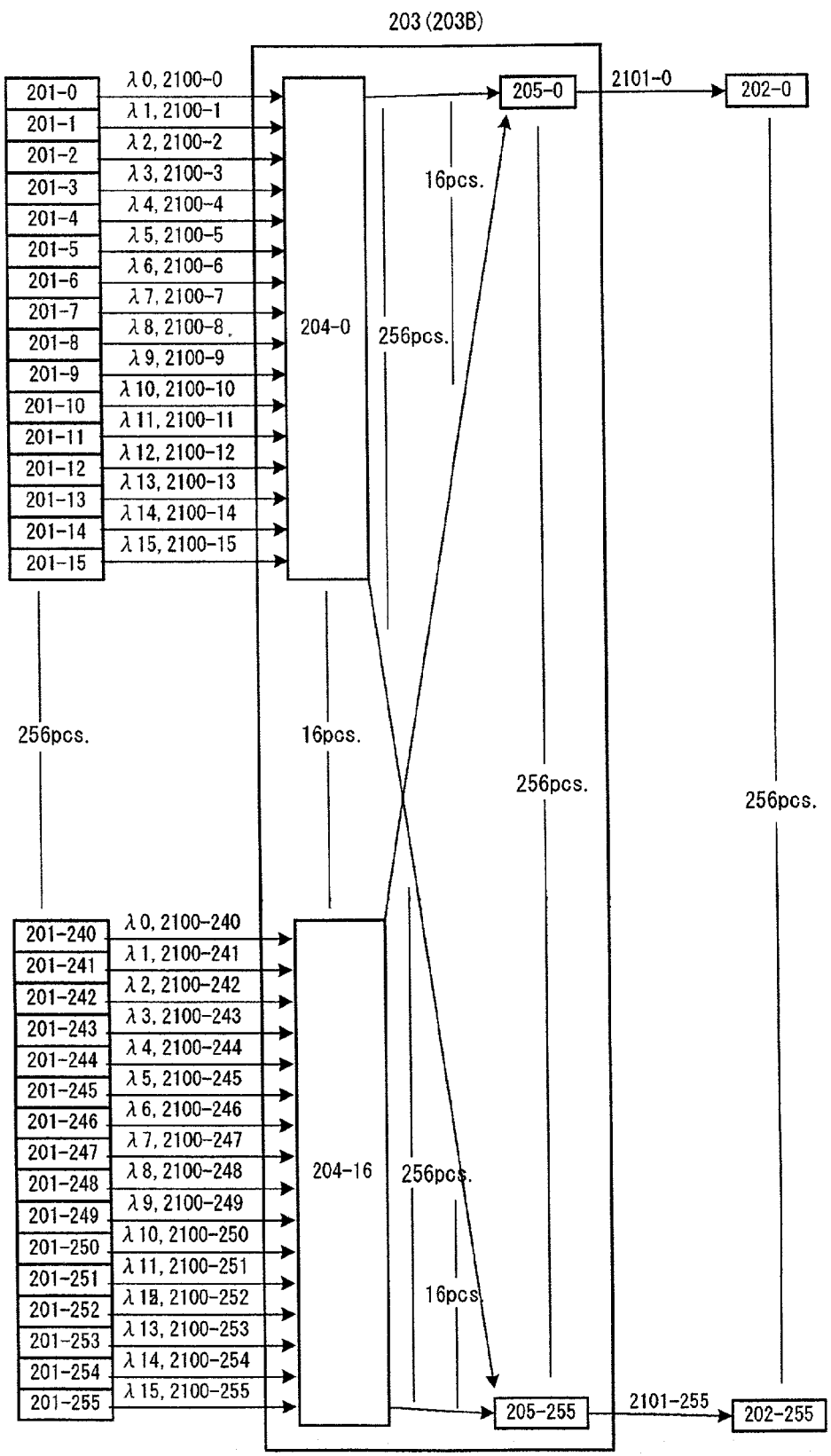
FIG. 15 is a block diagram showing the configuration of the second optical switch network.

FIG. 15 is a block diagram of an optical switch network in which the optical switch device of the present invention has been applied. FIG. 15 shows a 256×256 optical switch network.

In this optical switch network, 16 wavelengths from $\lambda 0$ to $\lambda 15$ are used as the wavelengths of optical signals, $\lambda 0$ being assigned as the transmission wavelength of transmission nodes 201-0, 201-16 (not shown in the figure), 201-32 (not shown), 201-240; $\lambda 1$ being assigned as the transmission wavelength of transmission nodes 201-1, 201-17 (not shown), 201-33 (not shown), . . . , 201-241; $\lambda 2$ being assigned as the transmission wavelength of transmission nodes 201-2, 201-18 (not shown), 201-34 (not shown), . . . , 201-242; and so on for succeeding wavelengths up to $\lambda 15$, which is assigned as the transmission wavelength of transmission nodes 201-15, 201-31 (not shown), 201-47 (not shown), . . . , 201-255.

Figure 16:
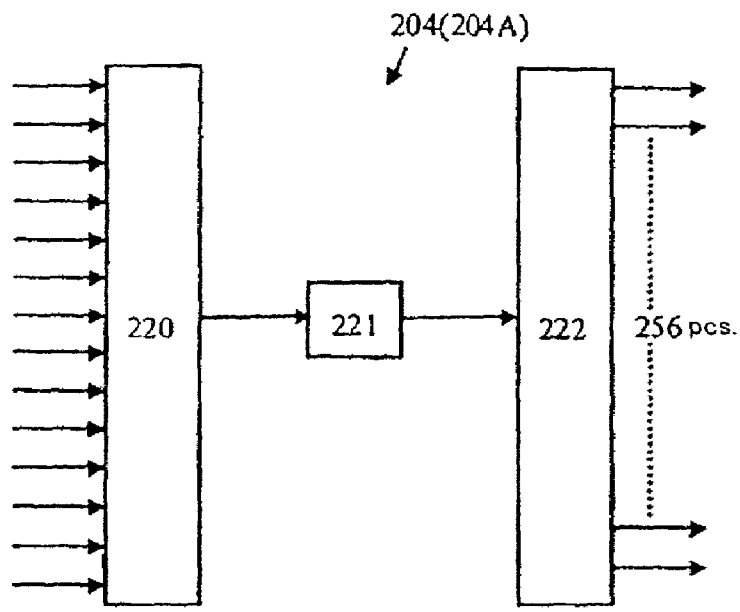
FIG. 16 is a block diagram showing the configuration of an optical multiplexer/demultiplexer in the second optical switch network.

Optical signals of wavelengths $\lambda 0$ to $\lambda 15$ that are transmitted from the 16 transmission nodes 201 to which different transmission wavelengths have been assigned are received at optical multiplexer/demultiplexers 204. FIG. 16 is a block diagram showing the configuration of optical multiplexer/demultiplexer 204 (204A). Optical signals of received wavelengths $\lambda 0$ to $\lambda 15$ are multiplexed by optical wavelength multiplexer 220, the multiplexed wavelength division multiplexed optical signals are amplified by optical fiber amplifier 221, and then branched into 256 branches by 1 (256 optical demultiplexer 222. The wavelength division multiplexed optical signals that are outputted from optical multiplexer/demultiplexer 204 (204A) are distributed between 256 optical selectors 205.

Figure 17:
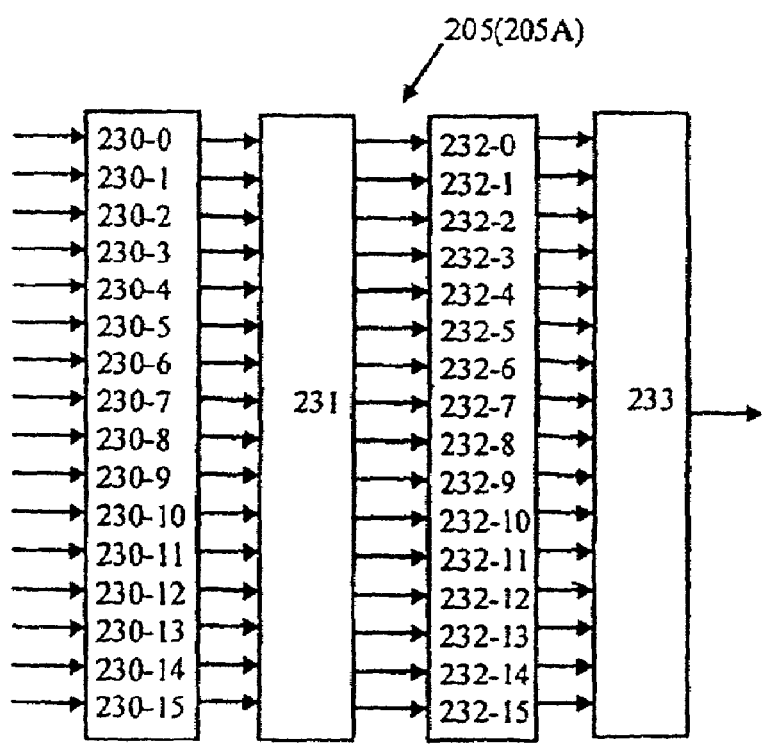
FIG. 17 is a block diagram showing the configuration of an optical selector in the second optical switch network.

FIG. 17 is a block diagram showing the configuration of optical selector 205 (205A). Optical selector 205A is constituted by optical gates for space selection 230, optical wavelength router 231, optical gates for wavelength selection 232, and optical multiplexer 233. The sixteen input ports of optical selector 205A are each connected to a respective optical multiplexer/demultiplexer of the sixteen optical multiplexer/demultiplexers 204 (204A). One of optical gates 230-0 to 230-15 is turned ON and the remaining 15 are turned OFF, whereby the wavelength division multiplexed optical signal that is outputted from a desired optical multiplexer/demultiplexer 204 can be selectively applied to optical wavelength router 231.

Optical wavelength router 231 is an array waveguide diffraction grating device, and its wavelength transmission characteristic is a Latin square (Reference 3: R. Barry, et al., "Latin Routers, Design and Implementation," IEEE Journal of Lightwave Technology, Vol. 11, No. 5/6, pp. 891–899, 1993). By means of this Latin square wavelength transmission characteristic, a wavelength division multiplexed optical signal of wavelengths $\lambda 0$ to $\lambda 15$ is demultiplexed by wavelength and outputted from respective different output ports regardless of the input port of wavelength router 231 at which the wavelength division multiplexed optical signal is received.

Turning ON one of optical gates 230-0 to 230-15 and turning OFF the remaining fifteen allows only the optical signal of any particular wavelength within the wavelength division multiplexed optical signal that has been applied to optical wavelength router 231 to be outputted from optical multiplexer 233. In other words, through a combination of the selection of space by optical gates 230 and the selection of wavelength by optical gates 232, optical selector 205A can selectively output an optical signal that has been transmitted from a particular transmission node 201.

Optical signals that are outputted from optical selector 205A are received by reception nodes 202. By the process described hereinabove, reception nodes 202-0 to 202-255 can each receive optical signals that have been transmitted from any transmission node 201, and optical gates 230 and 232 that are turned ON at this time in optical selector 205A can be uniquely determined for any desired transmission node 201, whereby optical switch device 203B also functions as a crossbar switch.

Third Optical Switch Network

Figure 18:
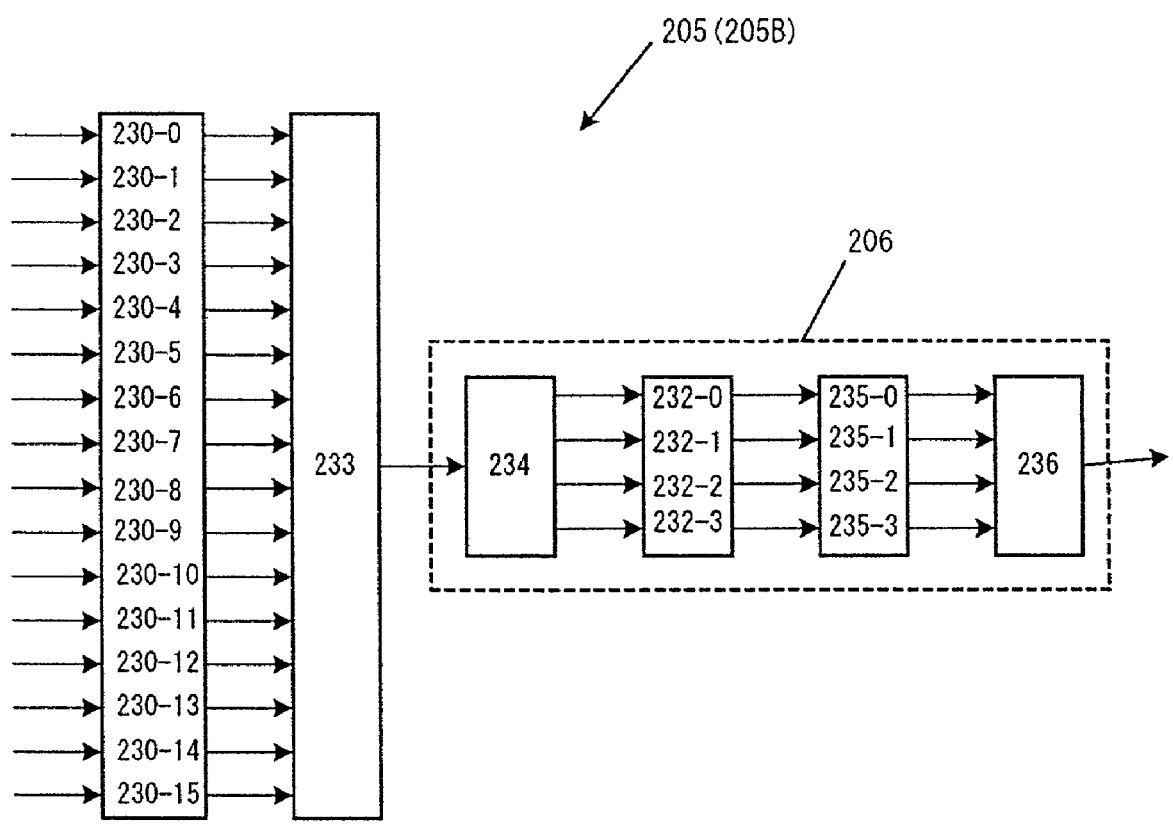
FIG. 18 is a block diagram showing the configuration of an optical selector in the third optical switch network.

The configuration of an optical selector that is shown in the block diagram of FIG. 18 is basically equivalent to the optical switch network shown in FIG. 15, but the constitution of optical selector 205 differs from that of the second optical switch network.

In this optical selector 205B, the wavelength division multiplexed optical signals that are outputted from optical gates for space selection 230 pass through optical multiplexer 233 and are applied to multistage wavelength selector 206 that is constituted by optical wavelength demultiplexer 234, optical gates 232, optical wavelength router 231 (not shown in the figure), optical gates 235, and optical wavelength multiplexer 236. The wavelength division multiplexed optical signals that are received at optical wavelength demultiplexer 234 are demultiplexed by four wavelengths, and the wavelength division multiplexed optical signals of wavelengths $\lambda 0$ to $\lambda 3$ are applied to optical gate 232-0, the wavelength division multiplexed optical signals of wavelengths $\lambda 4$ to $\lambda 7$ are applied to optical gate 232-1, the wavelength division multiplexed optical signals of wavelengths $\lambda 8$ to $\lambda 11$ are applied to optical gate 232-2, and the wavelength division multiplexed optical signals of wavelengths $\lambda 12$ to $\lambda 15$ are applied to optical gate 232-3.

If, for example, only optical gate 232-0 is turned ON in this case, the wavelength division multiplexed optical signals of wavelengths $\lambda 0$ to $\lambda 3$ are applied to optical wavelength router 231 (not shown in the figure). Optical wavelength router 231 demultiplexes the received wavelength division multiplexed optical signal by wavelength if any of optical gates 232-0 to 232-3 are ON, and outputs each of the demultiplexed signals from a different output port. When a wavelength division multiplexed optical signal of wavelengths $\lambda 0$ to $\lambda 3$ is applied from optical gate 232-0, the optical signal of wavelength $\lambda 0$ is outputted to optical gate 235-0, the optical signal of wavelength $\lambda 1$ is outputted to optical gate 235-1, the optical signal of wavelength $\lambda 2$ is outputted to optical gate 235-2, and the optical signal of wavelength λ3 is outputted to optical gate 235-3. If, for example, only optical gate 235-0 is ON, the optical signal of wavelength λ0 passes through optical wavelength multiplexer 236 and is outputted. Multistage wavelength selector 206 is thus capable of selectively outputting an optical signal of any particular wavelength from a wavelength division multiplexed optical signal of 16 wavelengths by turning ON each of optical gates 232 and optical gates 235 one by one.

Fourth Optical Switch Network

Figure 19:
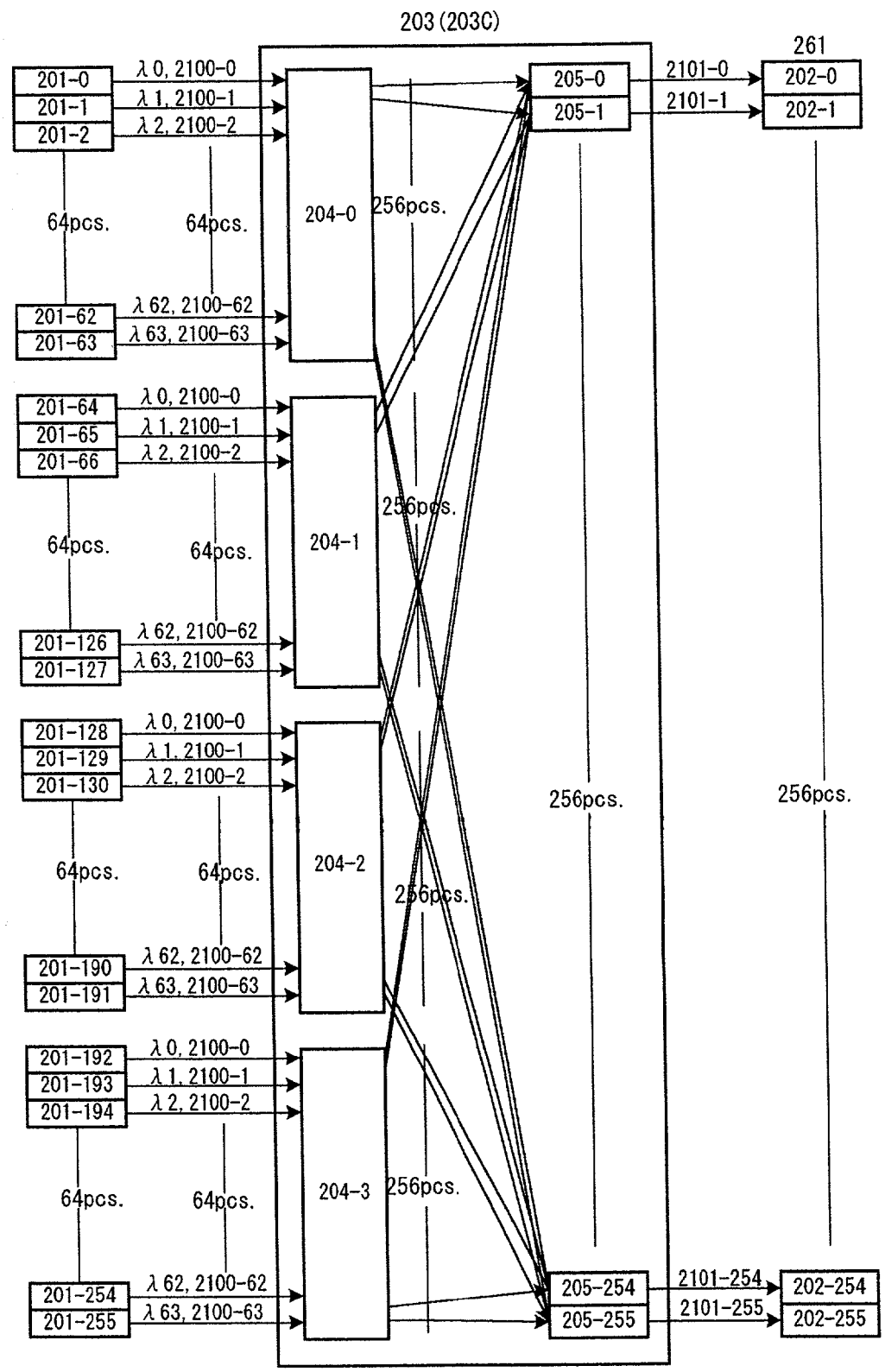
FIG. 19 is a block diagram showing the configuration of the fourth optical switch network.

FIG. 19 is a block diagram of an optical switch network in which the optical switch device of the present invention is applied. In this fourth optical switch network, 64 wavelengths from λ0 to λ63 are used as the wavelengths of optical signals, λ0 being assigned as the transmitted wavelength of transmission nodes 201-0, 201-64, 201-128, and 201-192; λ1 being assigned as the transmitted wavelength of transmission nodes 201-1, 201-65, 201-129, and 201-193; λ2 being assigned as the transmitted wavelength of transmission nodes 201-2, 201-66, 201-130, and 201-194; and so on up to λ63, which is assigned as the transmission wavelength of transmission nodes 201-63, 201-127, 201-191, and 201-255.

Figure 20:
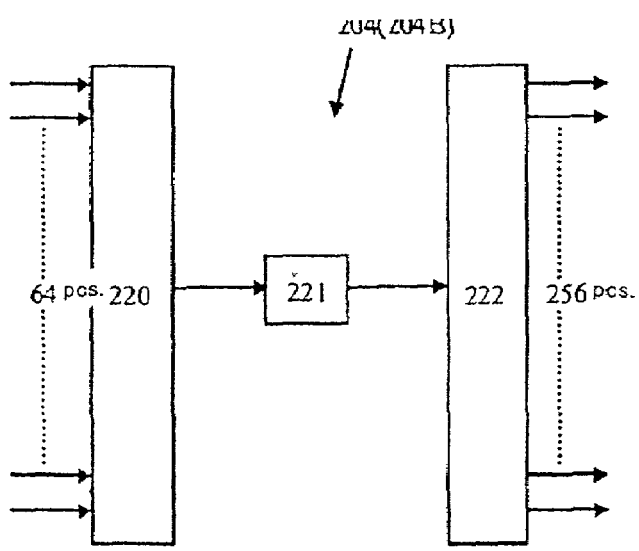
FIG. 20 is a block diagram showing the configuration of an optical multiplexer/demultiplexer in the fourth optical switch network.

The optical signals of wavelengths λ0 to λ63 that are transmitted from optical transmitters in the 64 transmission nodes 201 to which different transmission wavelengths have been assigned are received at optical multiplexer/demultiplexers 204. FIG. 20 is a block diagram showing the configuration of optical multiplexer/demultiplexer 204 (204B). The optical signals of wavelengths λ0 to λ63 that are received are multiplexed by optical wavelength multiplexer 220, which is an array waveguide diffraction grating device, and the multiplexed wavelength division multiplexed optical signals are then amplified by optical fiber amplifier 221 and branched into 256 portions by 1×256 optical demultiplexer 222.

Figure 21:
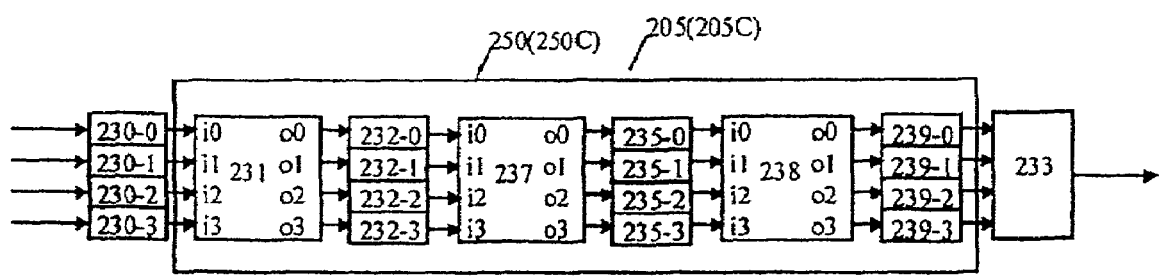
FIG. 21 is a block diagram showing the configuration of an optical selector in the fourth optical switch network.

The wavelength division multiplexed optical signals that are outputted from optical multiplexer/demultiplexers 204 (204B) are distributed between 256 optical selectors 205. FIG. 21 is a block diagram showing the configuration of optical selector 205 (205C). Optical selector 205C is made up by: optical gates for space selection 230; optical wavelength routers 231, 237, and 238; optical gates for wavelength selection 232, 235, and 239; and optical multiplexer 233. Wavelength selector 250 (250C) is made up by optical wavelength routers 231, 237, and 238 and optical gates 232, 235, and 239.

The four input ports of each optical selector 205C are each connected to a respective optical multiplexer/demultiplexer of the four optical multiplexer/demultiplexers 204. By turning ON one of optical gates 230-0 to 230-3 and turning OFF the remaining three, the wavelength division multiplexed optical signal that is outputted from a desired optical multiplexer/demultiplexer 204 can be selectively applied to optical wavelength router 231. Optical wavelength routers 231, 237, and 238 are array waveguide diffraction grating devices that are constituted by quartz waveguides, and the wavelength transmission characteristic of these components is a Latin square as shown in FIG. 22, FIG. 23, and FIG. 24, respectively. This type of wavelength transmission characteristic can be easily realized by appropriately determining the transmission bandwidth and free-spectral range of the array waveguide diffraction grating.

Assuming that optical gates 230-0, 232-0, 235-0, and 239-0 are ON and the remaining optical gates are OFF, the wavelength division multiplexed optical signal of wavelengths λ0 to λ63 is applied to optical wavelength router 231 from input port i0, following which the wavelength division multiplexed optical signal of wavelengths λ0 to λ15 is outputted from output port o0, the wavelength division multiplexed optical signal of wavelengths λ16 to λ31 is outputted from output port o1, the wavelength division multiplexed optical signal of wavelengths λ32 to λ47 is outputted from output port o2, and the wavelength division multiplexed optical signal of wavelengths λ48 to λ63 is outputted from output port o3.

Since optical gate 232-0 is ON in this case, a wavelength division multiplexed optical signal of wavelengths λ0 to λ15 is applied to optical wavelength router 237 from input port i0, following which the wavelength division multiplexed optical signal of wavelengths λ0 to λ3 is outputted from output port o0, the wavelength division multiplexed optical signal of wavelengths λ4 to λ7 is outputted from output port o1, the wavelength division multiplexed optical signal of wavelengths λ8 to λ11 is outputted from output port o2, and the wavelength division multiplexed optical signal of wavelengths λ12 to λ15 is outputted from output port o3.

Since optical gate 235-0 is ON in this case, the wavelength division multiplexed optical signal of wavelengths λ0 to λ3 is applied to optical wavelength router 238 from input port i0, and an optical signal of wavelength λ0 is outputted from output port o0, an optical signal of wavelength λ1 is outputted from output port o1, an optical signal of wavelength λ2 is outputted from output port o2, and an optical signal of wavelength λ3 is outputted from output port o3.

Since optical gate 239-0 is ON in this case, only the optical signal of wavelength λ0 is outputted from optical multiplexer 233.

Thus, as with multistage wavelength selector 206 of the third optical switch network, an optical signal of any particular wavelength can be selected from a wavelength division multiplexed optical signal of 64 wavelengths in optical selector 205C of this fourth optical switch network by turning ON one each of the four optical gates 232, the four optical gates 235, and the four optical gates 239. The combination of the wavelength selection capability of optical gates 232, 235, and 239 and the space selection capability of optical gates 230 enables optical selector 205C to selectively output an optical signal that is transmitted from any transmission node 201.

Optical signals that have been outputted from optical selector 205C are received by optical receivers 261 in reception nodes 202. As described in the foregoing explanation, reception nodes 202-0 to 202-255 can each receive optical signals that are transmitted from any transmission node 201, and optical gates 230, 232, 235, and 239 that are turned ON at this time in optical selector 205C can be uniquely determined for any desired transmission node 201, whereby this optical switch device 203 (203C) functions as a crossbar switch.

In this optical switch network, 16 optical gates are used for each optical selector 205 and 4096 optical gates are used in the entire optical switch network. This number of optical gates is 1/16 of 65536, which is the number of optical gates necessary for realizing a 256×256 optical switch network of the same configuration as the first optical switch network; one half of 8192, which is the number of optical gates necessary for constituting the second optical switch network; and equal to the number of optical gates that are necessary in the third optical switch network when the number of wavelengths is 64 and the number of optical multiplexer/demultiplexers 204 is four.

The number of wavelengths that can be selected by this optical selector 205C is determined as a product of the number of optical gates 232, 235, and 239 that contribute to wavelength selection. Conversely, to constitute optical selector 205C for selecting a particular number of wavelengths, the product of the numbers of optical gates per stage that contribute to wavelength selection must be equal to the number of wavelengths. Accordingly, the number of optical gates that contribute to wavelength selection is a minimum when the number of optical gates per stage is 4 or a prime number. In other words, the number of optical gates that contribute to wavelength selection in this fourth optical switch network can be said to be a minimum because the number of optical gates per stage is 4.

When the number of wavelengths in the third optical switch network is 64 and the number of optical multiplexer/demultiplexers 204 is 4, the components that correspond to optical multiplexers 233 are 4×1 optical multiplexers, but a minimum of 6 decibels of loss occurs in these optical multiplexers. Since the loss of optical wavelength demultiplexer 234 of the third optical switch network is equal to the loss of optical wavelength router 231 of the fourth optical switch network, the loss from optical gates 230 to optical gates 232 in the fourth optical switch network is a minimum of 6 decibels less, and the bit error rate in optical receivers 261 of reception node 202 can be reduced to this extent. This advantage becomes more significant as the number of optical multiplexer/demultiplexers 204 increases, i.e., as the scale of the optical switch network increases.

In this fourth optical switch network, coherent crosstalk tends not to occur because optical signals of the same wavelength that are received from different optical multiplexer/demultiplexers 204 in optical wavelength router 231 are outputted from different output ports. Accordingly, the ON/OFF ratio that is demanded of optical gates 230 in this fourth optical switch network can be lower than in the third optical switch network.

Finally, this fourth optical switch network is a 256×256 optical switch network in which W=64, S=4, R=3, and K1=K2=K3=4 in the sixth invention (the invention according to claim 6) and the fifteenth invention (the invention according to claim 15) of the present application.

Fifth Optical Switch Network

Figure 25:
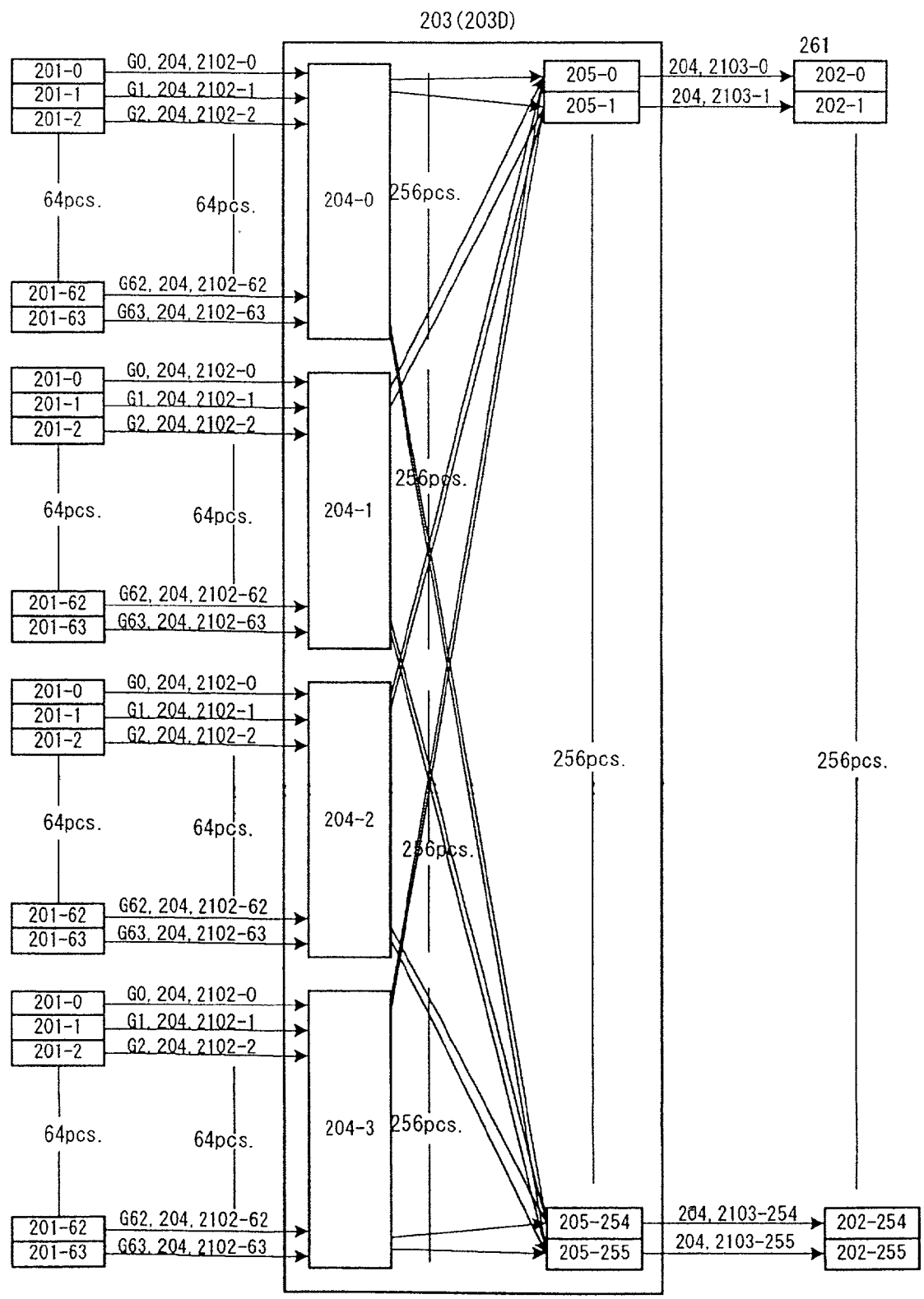
FIG. 25 is a block diagram showing the configuration of the fifth optical switch network.

FIG. 25 is a block diagram of an optical switch network in which the optical switch device of the present invention has been applied. The configuration of this fifth optical switch network is basically the same as the configuration of FIG. 19, but this configuration differs in that a wavelength group composed of four different wavelengths is assigned to each transmission node 201, whereas only one wavelength was assigned in the configuration of FIG. 19.

Figure 26:
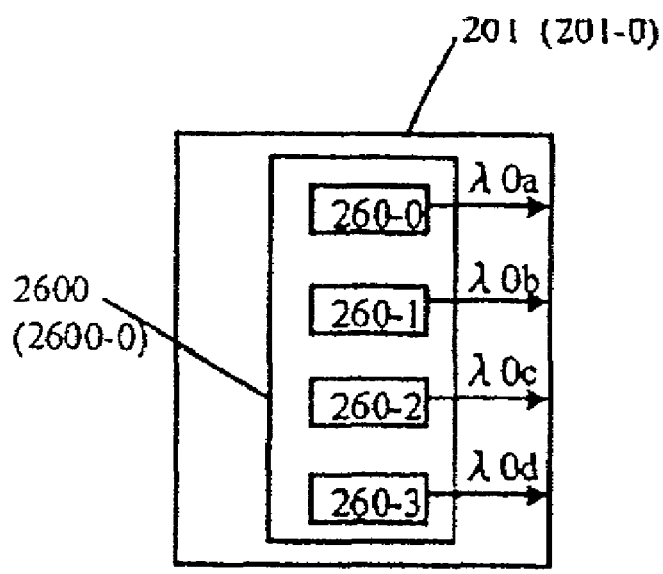
FIG. 26 is a block diagram showing the configuration of a transmission node in the fifth optical switch network.

FIG. 26 is a block diagram showing the configuration of transmission nodes 201 of the optical switch network that is shown in FIG. 25. Transmission nodes 201 are each provided with four optical transmitters 260 that constitute optical transmitter array 2600, and as the transmission wavelengths of these optical transmitters 260, for example, wavelength group G0 composed of wavelengths $\lambda 0a$, $\lambda 0b$, $\lambda 0c$, and $\lambda 0d$ is assigned to transmission node 201-0. Wavelengths $\lambda 0a$, $\lambda 0b$, $\lambda 0c$, and $\lambda 0d$ are wavelengths in the vicinity of $\lambda 0$ in the fourth optical switch network. Each transmission node 201 and optical multiplexer/demultiplexer 204 are interconnected by optical fiber array 2102 in which four optical fibers are bundled.

Figure 27:
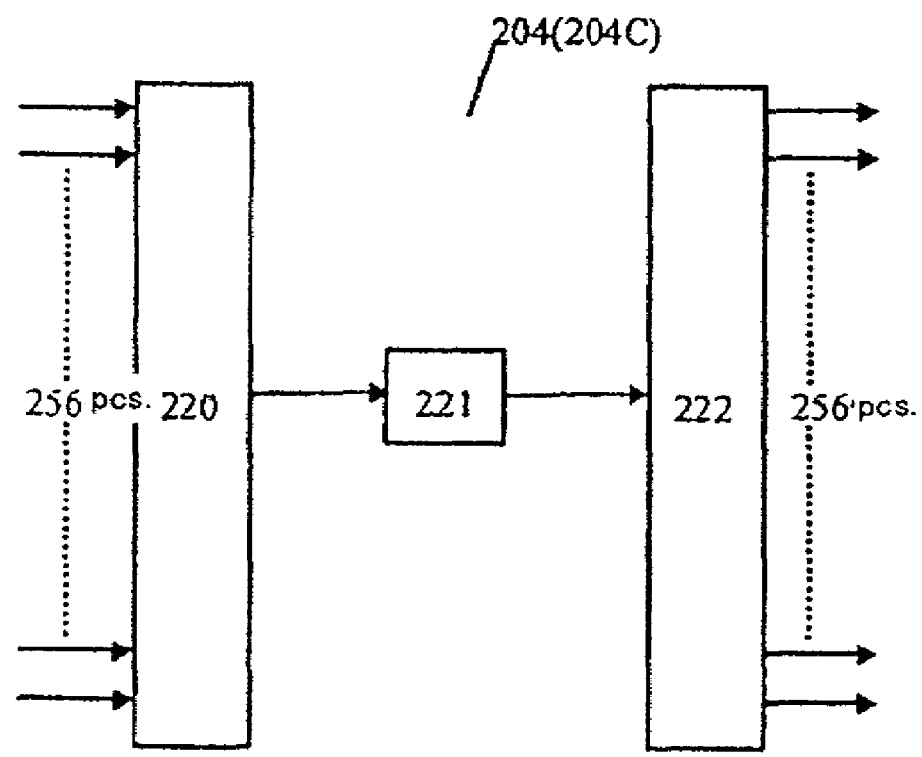
FIG. 27 is a block diagram showing the configuration of an optical multiplexer/demultiplexer in the fifth optical switch network.

FIG. 27 is a block diagram showing the configuration of optical multiplexer/demultiplexer 204 (204C). Optical multiplexer/demultiplexers 204 (204C) are equivalent to optical multiplexer/demultiplexers 204B of the fourth optical switch network with the exception that optical wavelength multiplexers 220 are of a 256×1 form because each transmission node 201 transmits optical signals of four wavelengths. The output of each optical multiplexer/demultiplexer 204C is distributed between 256 optical selectors 205.

Figure 28:
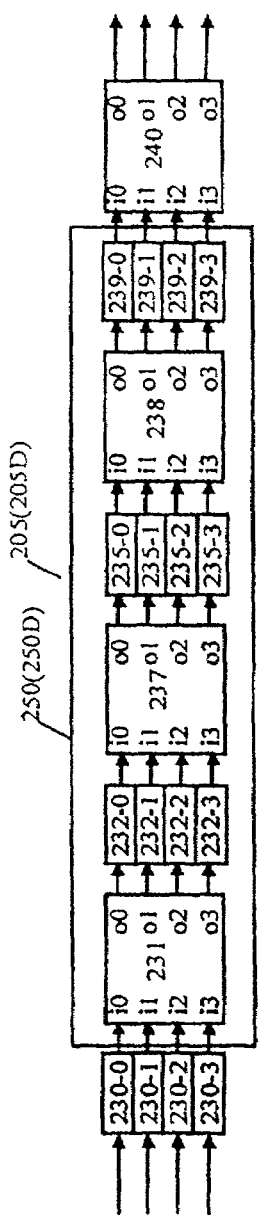
FIG. 28 is a block diagram showing the configuration of an optical selector in the fifth optical switch network.

FIG. 28 is a block diagram showing the configuration of optical selector 205 (205D). The configuration from optical gates 230 to optical gates 239 and the characteristics of optical wavelength routers 231, 237, and 238 are equivalent to those of the fourth optical switch network. Optical wavelength selector 250 (250D) is constituted by optical wavelength routers 231, 237, and 238 and optical gates 232, 235, and 239. The wavelength groups in this fifth optical switch network are composed of four wavelengths in the vicinity of the wavelength having the same number in the fourth optical switch network. As an example, wavelengths $\lambda 0a$, $\lambda 0b$, $\lambda 0c$, and $\lambda 0d$ belonging to wavelength group G0 behave similarly to wavelength $\lambda 0$ in the fourth optical switch network.

Figure 31:
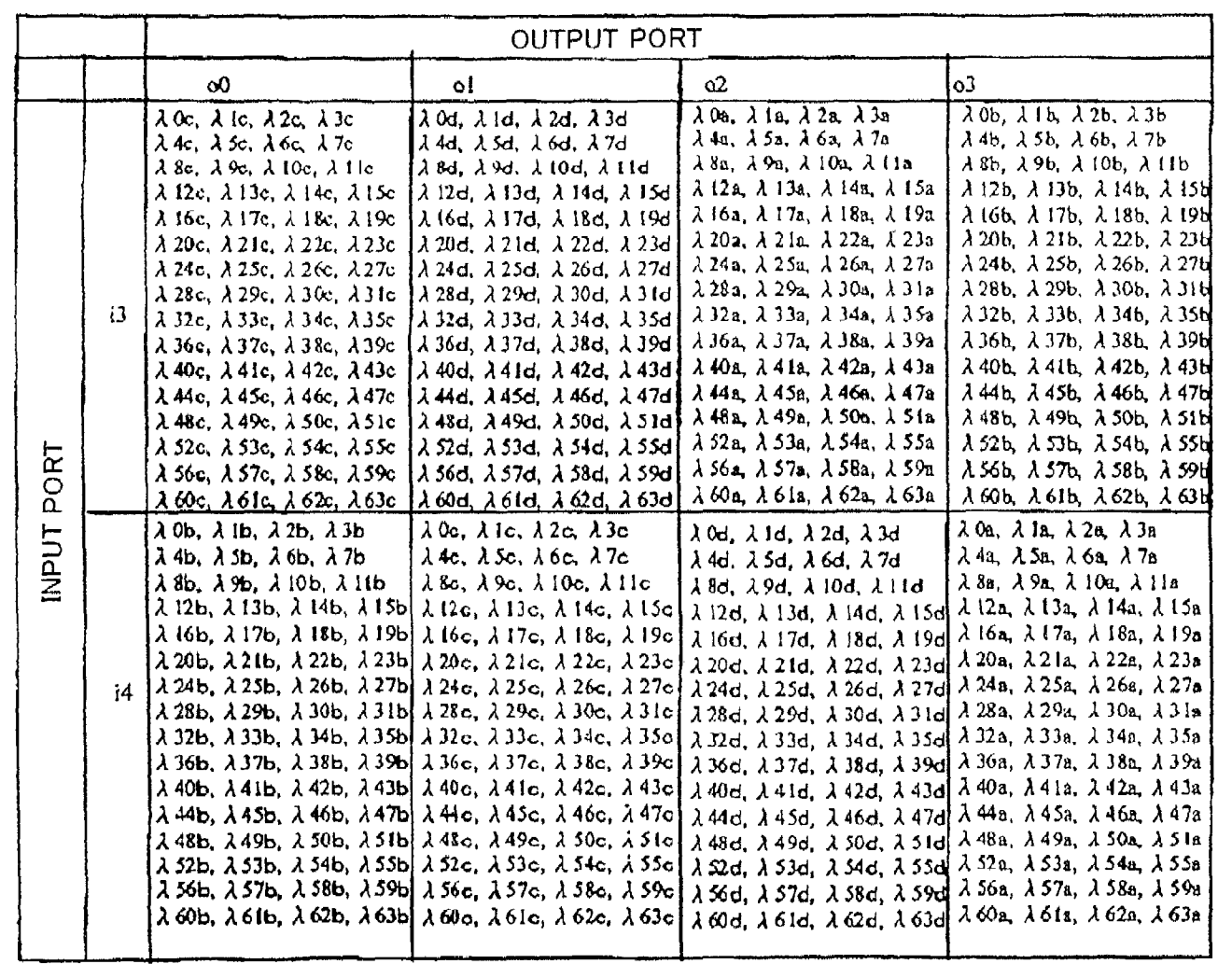

Accordingly, when optical gates 230-0, 232-0, 235-0, and 239-0 are ON, the four optical signals of wavelengths $\lambda 0a$, $\lambda 0b$, $\lambda 0c$, and $\lambda 0d$ that are transmitted from transmission node 201-0 are received at input port i0 of optical wavelength router 240. Optical wavelength router 240 is an array waveguide diffraction grating device, and the wavelength transmission characteristic of this component is as shown in FIG. 30 and FIG. 31. This wavelength transmission characteristic allows the wavelength division multiplexed optical signal of a particular wavelength group that is applied to optical wavelength router 240 to be demultiplexed by wavelength and outputted from different respective output ports. For example, when a wavelength division multiplexed optical signal composed of four optical signals of wavelengths $\lambda 0a$, $\lambda 0b$, $\lambda 0c$, and $\lambda 0d$ is received from input port i0, optical signals of wavelengths $\lambda 0a$, $\lambda 0b$, $\lambda 0c$, and $\lambda 0d$ are outputted from output ports o0, o1, o2, and o3, respectively.

Figure 29:
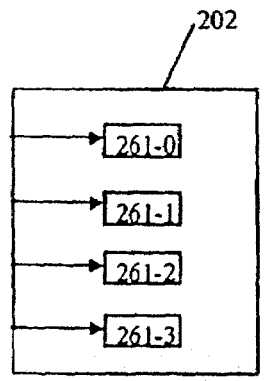
FIG. 29 is a block diagram showing the configuration of a reception node in the fifth optical switch network.

Optical signals that are outputted from optical selector 205D are propagated through optical fiber array 2103, in which 204 optical fibers are bundled, and received at reception nodes 202. FIG. 29 is a block diagram showing the configuration of reception node 202. Reception node 202 receives the four optical signals that are received from optical fiber array 2103 by means of four optical receivers 261.

As described in the foregoing explanation, reception nodes 202-0 to 202-255 can each receive the wavelength division multiplexed optical signal that is transmitted from any transmission node 201, and optical gates 230, 232, 235, and 239 in optical selector 205 that are turned ON at this time can be uniquely determined for any desired transmission node 201. Optical switch device 203 (203D) of this fifth optical switch network thus functions as a crossbar switch.

As with the fourth, the fifth optical switch network features the advantageous effects that fewer optical gates are required, the loss from optical gates 230 to optical gates 232 is lower, and coherent crosstalk tends not to occur. In addition, since four optical signals are transmitted and received per set of transmission nodes and reception nodes in this fifth optical switch network, four times the volume of information can be transmitted and received if the bit rate per optical signal is the same. In other words, a fourfold increase in throughput can be obtained in this fifth optical switch network using the same number of optical gates as in the fourth optical switch network.

The configuration of the fifth optical switch network is a 256×256 optical switch network in which V=4, W=64, S=4, R=3, and K1=K2=K3=4 in the eighth invention (the invention according to claim 8) and the fifteenth invention (the invention according to claim 15) of the present application.

Sixth Optical Switch Network

Figure 32:
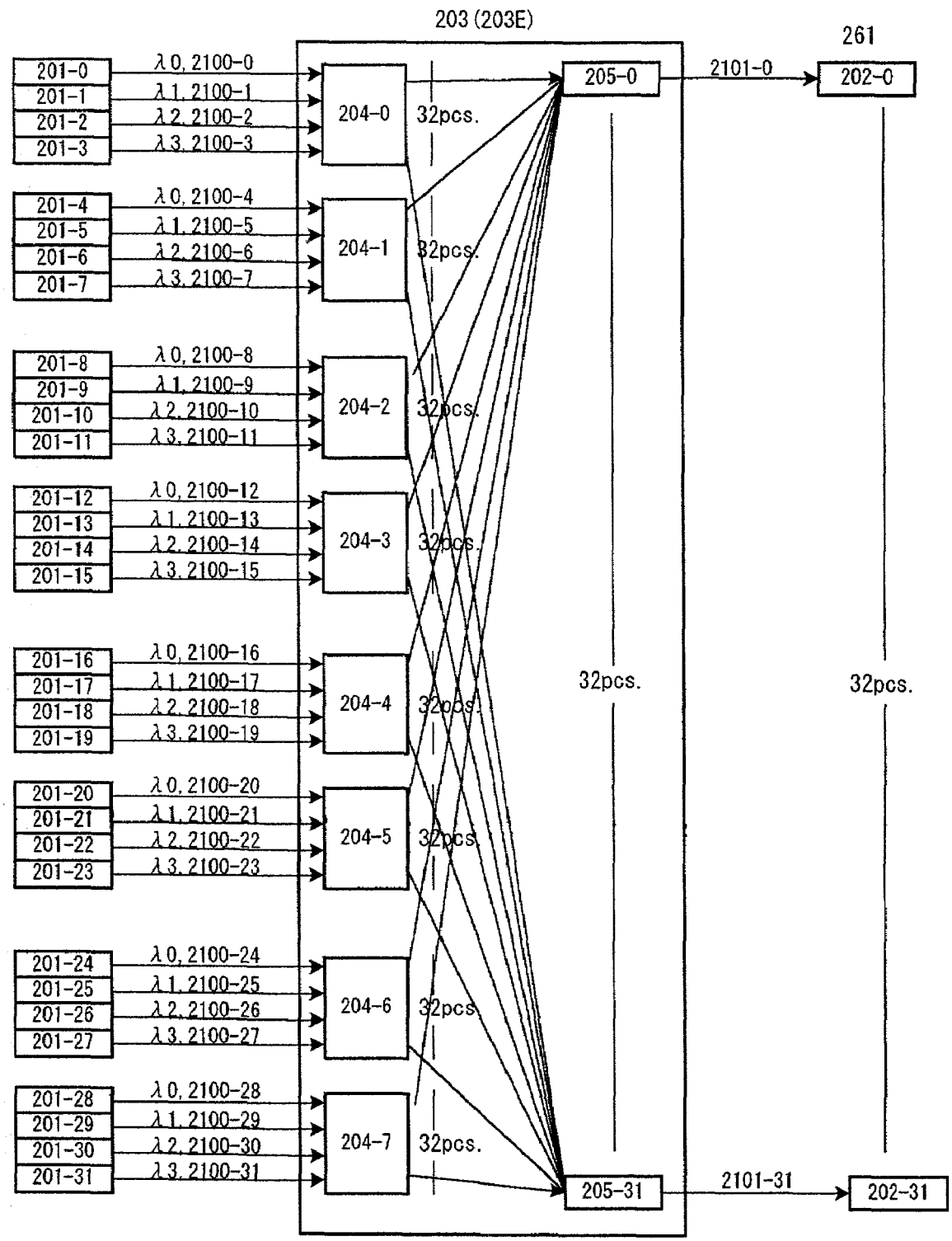
FIG. 32 is a block diagram showing the configuration of the sixth optical switch network.

FIG. 32 is a block diagram of an optical switch network in which the optical switch device of the present invention is applied. The configuration of this optical switch network is basically equivalent to the configuration of the second optical switch network with the exception of the configuration of optical selectors 205. Here, only the configuration and operation of optical selectors 205 will be described.

FIG. 33 is a block diagram showing the configuration of optical selector 205 (205E). Optical selector 205E of the sixth optical switch network is equivalent to optical selector 205A shown in FIG. 17 with array optical gate 241 and optical multiplexer 242 added in the preceding section. FIG. 34 is a perspective view showing the configuration of array optical gate 241.

Array optical gate 241 is a mechanical optical gate by which, when shield plate 2300 is not inserted, optical signals that are applied to optical fibers 2110, 2111, 2112, and 2113 pass by way of space propagation unit 2200 (not shown in the figure), which is collimating optics, and are each directed to optical fibers 2120, 2121, 2122, and 2123, respectively. In other words, the four paths are all ON in this state. When shield plate 2300 is inserted, the four optical signals are blocked in space propagation unit 2200, whereby the OFF state is established and none of the optical signals is directed to optical fibers 2120, 2121, 2122, and 2123.

Array optical gate 241 is thus capable of turning four optical signals (four paths) ON and OFF simultaneously and constitutes a 4-array optical gate. In FIG. 33, two array optical gates 241 (241-0 and 241-1) and four optical multiplexers 242 (242-0 to 242-3) are combined to constitute 4-array 2×1 array optical selector 251 (251E) that has two paths in which four paths can be turned ON and OFF simultaneously as a single path and that allows selective ON/OFF switching of these two paths. For example, when array optical gate 241-0 is turned ON and 241-1 is turned OFF, the four optical signals that are received by array optical gate 241-0 are outputted from optical multiplexers 242-0 to 242-3.

As described hereinabove, turning ON each of array optical gates 241 and optical gates 230 one at a time allows a wavelength division multiplexed optical signal of wavelengths λ0 to λ3 that is received from one of the eight input ports of optical selector 205E to be selectively applied to optical wavelength router 231. The wavelength transmission characteristic of optical wavelength router 231 is as shown in FIG. 35, and the received wavelength division multiplexed optical signal of wavelengths λ0 to λ3 is therefore demultiplexed by wavelength and then outputted from each the four output ports. Turning ON only one of the four optical gates 232 allows only the optical signal of a particular wavelength to be outputted from optical multiplexer 233.

The optical signals that are outputted from optical selectors 205 (205E) are received by optical receivers 261 in reception nodes 202. By means of the above-described operation, reception nodes 202-0 to 202-31 can each receive optical signals that have been transmitted from any transmission node 201; and array optical gates 241, optical gates 230, and optical gates 232 in optical selectors 205E that are turned ON at this time can be uniquely determined for any desired transmission node 201, whereby this optical switch device 203 functions as a crossbar switch.

Two array optical gates and eight optical gates are required to construct this optical selector 205E. In a 32×32 optical switch network, a total of 64 array optical gates and 256 optical gates would be required. In the configuration shown in FIG. 15, however, 384 optical gates would be necessary to construct a 32×32 optical switch network with 4 as the number of wavelengths. Since a 4-array mechanical array optical gate has only one movable part, its cost does not greatly differ from a single mechanical optical gate. In addition, since drive circuits and signal lines are necessary for controlling active elements such as optical gates, a reduction of the total number of array optical gates and optical gates, i.e., the number of optical gate elements, contributes to a reduction of signal lines and drive circuits. Accordingly, the application of array optical gates to reduce the number of optical gate elements as in this sixth optical switch network can lower costs.

Further, by providing array optical selector 251E in the section preceding optical gates 230 in this optical selector 205E, the number of optical gates becomes four, which is equal to the number of optical gates 232. In an optical wavelength router that employs an array waveguide diffraction grating, an equal number of input ports and output ports is standard, while an 8×4 component having a different number of input ports and output ports is a special-order item and therefore expensive. Thus, in this sixth optical switch network, the provision of array optical selector 251E in the section preceding optical gates 230 allows the number of optical gates 230 to be set independently of the number of optical multiplexer/demultiplexers 204. Further, making the paths M of array optical gates 241 equal to the number of wavelengths W allows a standard 4×4 component to be used as optical wavelength router 231, thereby realizing a reduction of cost.

The constitution of the sixth optical switch network is a 32×32 optical switch network in which W=4, M=4, and N=2 in the ninth invention (the invention according to claim 9), the tenth invention (the invention according to claim 10), and the twelfth invention (the invention according to claim 12) of the present application.

Seventh Optical Switch Network

The configuration of an optical switch network that represents another embodiment of the present invention is basically equivalent to the configuration shown in the fourth optical switch network with the exception of the configuration of optical selectors 205. Here, only the configuration and operation of optical selectors 205 will be explained.

Figures 36, 37:
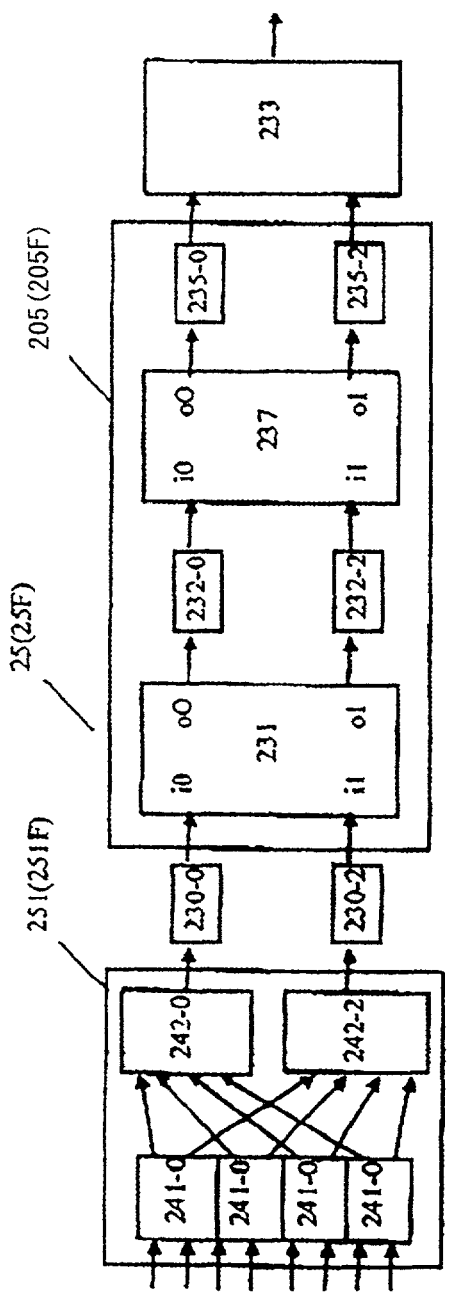
FIG. 36 is a block diagram showing the configuration of an optical selector in the seventh optical switch network.
FIG. 37 shows the wavelength transmission characteristic of an optical wavelength router in the seventh optical switch network.

FIG. 36 is a block diagram showing the configuration of optical selectors 205 (205F). Four 2-array array optical gates 241 and two 4×1 optical multiplexers 242 are used to constitute 2-array 4×1 array optical selector 251 (251F). This array optical selector 251 and optical gates 230 play a space selection role, and turning ON each of array optical gates 241 and optical gates 230 one at a time enables the wavelength division multiplexed optical signal that is received from any port of the eight input ports of optical selector 205F to be applied to optical wavelength router 231.

The wavelength transmission characteristics of optical wavelength router 231 and optical wavelength router 237 are as shown in FIG. 37 and FIG. 38. When a wavelength division multiplexed optical signal of wavelengths λ0 to λ3 is received from either input port i0 or i1 of optical wavelength router 231, turning ON optical gates 232 and optical gates 235 one at a time allows only the optical signal of any one wavelength to be outputted from optical multiplexer 233. By means of the above-described operation, optical selectors 205F of this seventh optical switch network realize absolutely the same functions as optical selectors 205E in FIG. 33.

Four array optical gates and six optical gates are necessary to construct this optical selector 205F. An entire 32×32 optical switch network requires 128 array optical gates and 192 optical gates. In other words, the number of optical gate elements in this seventh optical switch network is also less than the number of optical gates in the configuration shown in the second optical switch network when constructing a 32×32 optical switch network with four wavelengths, meaning the system can be realized at lower cost. Since the wavelength selection function in this seventh optical switch network is performed by multistage optical gates and optical wavelength routers, the effect of reducing the number of optical gate elements becomes more significant as the number of wavelengths increases. In particular, setting the number of optical gates per stage that contribute to wavelength selection to a prime number or 4 enables a minimization of the number of optical gates that contribute to wavelength selection.

In addition, since the number of optical gates 230, 232, and 235 in optical selector 205F in this seventh optical switch network need not equal the number of wavelengths or the number of optical multiplexer/demultiplexers 204, fewer limitations are imposed on the number of ports of optical wavelength routers 231 and 237, and standard 2×2 optical wavelength routers may therefore be employed.

Finally, this seventh optical switch network is a 32×32 optical switch network in which W=4, M=2, N=4, R=2, and K1=K2=2 in the eleventh invention (the invention according to claim 11), the twelfth invention (the invention according to claim 12), and the fifteenth invention (the invention according to claim 15) of the present application.

Eighth Optical Switch Network

Figure 39:
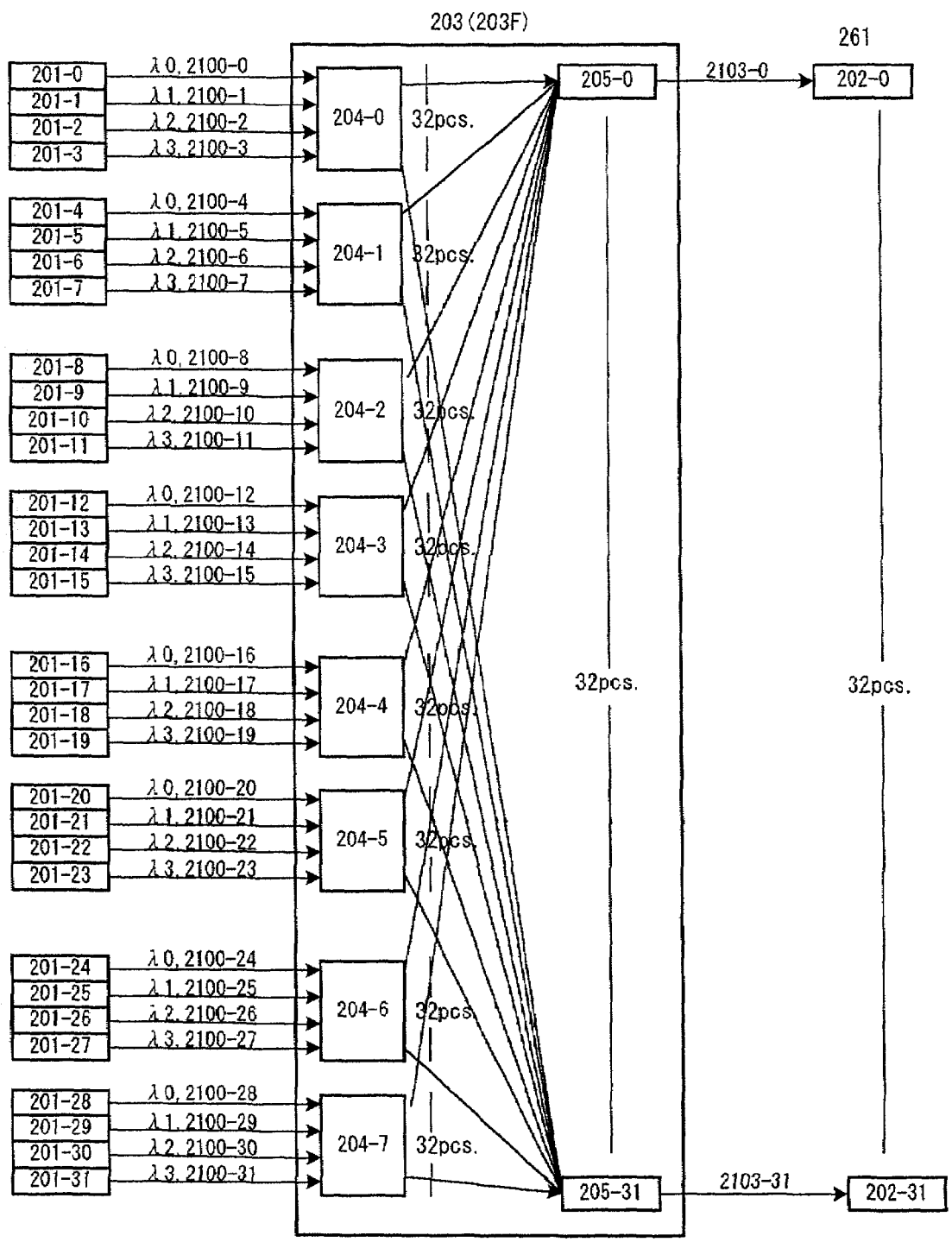
FIG. 39 is a block diagram showing the configuration of the eighth optical switch network.

FIG. 39 is a block diagram of an optical switch network in which the optical switch device of the present invention is applied. In contrast with the seventh optical switch network, in which one wavelength was assigned to each transmission node 201, a wavelength group composed of four different wavelengths is assigned in the eighth optical switch network. The configurations of transmission nodes 201 and reception nodes 202 in this eighth optical switch network are equivalent to those of transmission nodes 201 and reception nodes 202 in the sixth optical switch network, and transmission nodes 201 and optical multiplexer/demultiplexers 204 are connected by 4-array optical fiber arrays 2100, and optical selectors 205 and reception nodes 202 are connected by 4-array optical fiber arrays 2103.

Figures 40, 41:
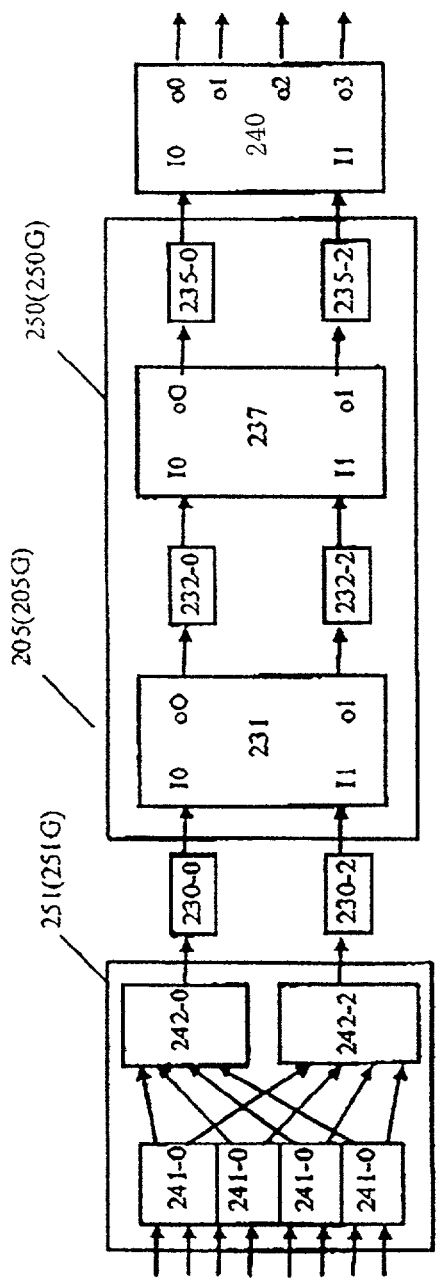
FIG. 40 is a block diagram showing the configuration of an optical selector in the eighth optical switch network.
FIG. 41 shows the wavelength transmission characteristic of an optical wavelength router in the eighth optical switch network. This shows the wavelength transmission characteristic of optical wavelength router 231 in FIG. 17.

FIG. 40 is a block diagram showing the configuration of optical selectors 205 (205G). The configuration from array optical gates 241 to optical gates 235 and the characteristics of optical wavelength routers 231 and 237 are equivalent to those of the seventh optical switch network. The wavelength groups in this eighth optical switch network are each composed of four wavelengths that are in the vicinity of wavelengths having the same reference numeral in the seventh optical switch network. For example, the wavelengths λ0a, λ0b, λ0c, λ0d of wavelength group G0 behave similarly to wavelength λ0 in the seventh optical switch network.

Accordingly, when array optical gate 241-0 and optical gates 230-0, 232-0, and 235-0 are ON, the four optical signals of wavelengths λ0a, λ0b, λ0c and λ0d that are transmitted from transmission node 201-0 are applied to input port i0 of optical wavelength router 240. Optical wavelength router 240 is an array waveguide diffraction grating, and its wavelength transmission characteristic is as shown in FIG. 41. In accordance with this wavelength transmission characteristic, the wavelength division multiplexed optical signal of a particular wavelength group that is applied to optical wavelength router 240 is branched by wavelength and each wavelength is then outputted from a different output port. As an example, when a wavelength division multiplexed optical signal composed of four optical signals of wavelengths λ0a, λ0b, λ0c, and λ0d is received from input port i0, the optical signals of wavelengths λ0a, λ0b, λ0c, and λ0d are outputted from output ports o0, o1, o2, and o3, respectively.

By means of the above-described operation, reception nodes 202-0 to 202-31 can receive the wavelength division multiplexed optical signal from any transmission node 201, and the array optical gates 241 and optical gates 230, 232, and 235 in optical selector 205G that are turned ON at this time can be uniquely determined for any desired transmission node 201. Optical switch device 203 (203F) of this eighth optical switch network therefore functions as a crossbar switch.

The eighth optical switch network exhibits the same effects, such as the fewer required optical gate elements, as the seventh optical switch network. In addition, since the eighth optical switch network transmits and receives four optical signals per combination of transmission node and reception node, the eighth optical switch network enables four times the amount of information to be transmitted and received if the bit rate per optical signal is the same. In other words, the eighth optical switch network uses the same number of optical gate elements as the seventh optical switch network but obtains four times the throughput.

Finally, this eighth optical switch network is a 32×32 optical switch network in which V=4, W=4, M=2, N=4, R=2, and K1=K2=2 in the thirteenth invention (the invention according to claim 13), the fourteenth invention (the invention according to claim 14), and the fifteenth invention (the invention according to claim 15) of the present application.

In the fourth to eighth optical switch networks, the values of V, W, M, N, R, S, K1, and K2 - - - KR can be freely determined within the limits indicated in the claims. The wavelength, bit rate, and modulation method of the optical signals can also take any form.

Although an array waveguide diffraction grating device constituted by a quartz waveguide was used as the optical wavelength router in the fourth to eighth optical switch networks, the form of the optical wavelength router is not limited to this form. A semiconductor waveguide or a polymer waveguide may also be used in place of a quartz waveguide; and, in place of the array waveguide diffraction grating, the optical wavelength router may also be constituted by a reflective diffraction grating or an optical fiber grating, or instead of a grating, by an interference film optical filter, a Fabry-Perot optical filter, or a Mach-Zehnder optical filter. Further, the wavelength transmission characteristic of the optical wavelength router is not limited to the form that is shown in the tables, and need not be a Latin square. The function of the optical wavelength router in the present invention is attained as long as the optical signal of the desired wavelength is ultimately obtained at the output of the optical selector.

Although a combination of mechanical array optical gates and optical multiplexer/demultiplexers was used as the array optical selector in the sixth to eighth optical switch networks, the array optical selector is not limited to this form. Optical switches that use the electro-optic effect, acousto-optic effect, and thermo-optic effect of a material such as lithium niobate crystal or polymer resin, liquid crystal switches, or mechanical optical switches may be used as the array optical selector in place of array optical gates. Alternatively, a semiconductor optical amplifier or an electro-absorption optical modulator may be used as the array optical gates.

Although a combination of an optical wavelength multiplexer, which was an array waveguide diffraction grating device, an optical fiber amplifier, and an optical demultiplexer was used as the optical multiplexer/demultiplexer in the fourth to eighth optical switch networks, the optical multiplexer/demultiplexer is not limited to this form. For example, a star coupler may also be used as the optical multiplexer/demultiplexer. Further, although optical signals of four wavelengths were separately transmitted from transmission nodes 201 in the fifth optical switch network (FIG. 25) and the eighth optical switch network (FIG. 39), the optical signals of four wavelengths may also be multiplexed and then transmitted as a wavelength division multiplexed optical signal.

While preferred embodiments of the present invention have been described using specific terms, such description is for illustrative purposes only, and it is to be understood that changes and variations may be made without departing from the spirit or scope of the following claims.

What is claimed is:

1. An optical switch device comprising:
 a plurality of optical switches for ON/OFF switching of beams by means of voltage that is applied to liquid crystal;
 one optical fiber installed on each side of each of said optical switches;
 a voltage application switching element for switching the optical switch of each of said plurality of optical switches to which voltage is applied;
 a plurality of switching lines and voltage application lines that are disposed in rows and columns for applying voltage to said voltage application switching element;
 a driver for switching between applying or not applying voltage to said switching lines and voltage application lines; and
 a substrate on which said optical switches are arranged that includes one or more holes that are formed for installing an end of one or more optical fibers,
 wherein each of said optical switches comprises:
  a first electrode that is formed over the substrate on which said switching element is formed;
  a liquid crystal layer that is formed over said first electrode;
  a second electrode that is formed over said liquid crystal layer
  wherein said substrate has a plurality of through holes that allow said first electrode to be in contact with said switching element; and
  a plate that is formed over said second electrode; wherein said one or more holes for installing ends of one or more optical fibers are formed in said plate.

2. An optical switch device according to claim 1, wherein said switching element is constituted by an element that includes at least one transistor.

3. An optical switch device according to claim 1, wherein said switching element includes an optical switch that:
 is at least one field-effect transistor that is formed on a transparent substrate, wherein a transparent electrode is connected to the source or drain of said field-effect transistor, and wherein liquid crystal is contained between said transparent electrode and an opposing transparent electrode, and
 performs ON/OFF switching of light by means of ON/OFF switching of voltage that is applied between said transparent electrode and said opposing transparent electrode.

4. An optical reception device, comprising:
 a wavelength selection unit that is provided with at least:
 an optical gate array for space selection that is composed of first to Sth (where S≧2) optical gates,
 a first-stage optical wavelength router for outputting each of optical signals that are received from K0 (where K0=S) input ports that are each connected to a respective optical gate of K0 optical gates of said optical gate array for space selection from any of K1 (where K1≧2) output ports according to wavelength,
 a first-stage optical gate array for wavelength selection that is composed of K1 optical gates that are each connected to a respective output port of the K1 output ports in said first-stage optical wavelength router,
 a second-stage optical wavelength router for outputting each of optical signals that are received from K1 input ports that are each connected to a respective optical gate of the K1 optical gates in said first-stage optical gate array for wavelength selection from any of K2 (where K2≧2) output ports according to wavelength, and
 a second-stage optical gate array for wavelength selection that is composed of K2 optical gates that are each connected to a respective output port of the K2 output ports of said second-stage optical wavelength router;
 an optical multiplexer for multiplexing optical signals that have been received from KR input ports that are each connected to a respective optical gate of KR optical gates that constitute the optical gate array for wavelength selection of the final stage R (where R≧2) of said wavelength selection unit; and
 an optical receiver for receiving optical signals that are outputted from said optical multiplexer;
 wherein said first-stage gate array for wavelength selection and said second-stage gate array for wavelength selection include one or more optical switch devices, wherein said one or more optical switch devices comprise:
 a plurality of optical switches for ON/OFF switching of beams by means of voltage that is applied to liquid crystal;
 one optical fiber installed on each side of each of said optical switches;
 a voltage application switching element for switching the optical switch of each of said plurality of optical switches to which voltage is applied;
 a plurality of switching lines and voltage application lines that are disposed in rows and columns for applying voltage to said voltage application switching element;
 a driver for switching between applying or not applying voltage to said switching lines and voltage application lines; and
 a substrate on which said optical switches are arranged that includes one or more holes that are formed for installing an end of one or more optical fibers.

5. An optical switch network that is provided with:
 first to Sth (where S≧2) optical transmitter groups that are each constituted by first to Wth (where W≧2) optical transmitters for transmitting optical signals each having a different wavelength;
 first to Sth optical multiplexer/demultiplexers for receiving the W optical signals that are transmitted from each of said first to Sth optical transmitter groups, demultiplexing wavelength division multiplexed optical signals in which W optical signals have been multiplexed, and outputting from WS (WS=W×S) output ports; and WS optical reception devices in which first to Sth optical gates are each connected to a different output port of said first to Sth optical multiplexer/demultiplexers wherein said optical reception devices comprise:
a wavelength selection unit that is provided with at least:
an optical gate array for space selection that is composed of first to Sth (where S≧2) optical gates,
a first-stage optical wavelength router for outputting each of optical signals that are received from K0 (where K0=S) input ports that are each connected to a respective optical gate of K0 optical gates of said optical gate array for space selection from any of K1 (where K1≧2) output ports according to wavelength,
a first-stage optical gate array for wavelength selection that is composed of K1 optical gates that are each connected to a respective output port of the K1 output ports in said first-stage optical wavelength router,
a second-stage optical wavelength router for outputting each of optical signals that are received from K1 input ports that are each connected to a respective optical gate of the K1 optical gates in said first-stage optical gate array for wavelength selection from any of K2 (where K2≧2) output ports according to wavelength, and
a second-stage optical gate array for wavelength selection that is composed of K2 optical gates that are each connected to a respective output port of the K2 output ports of said second-stage optical wavelength router;
an optical multiplexer for multiplexing optical signals that have been received from KR input ports that are each connected to a respective optical gate of KR optical gates that constitute the optical gate array for wavelength selection of the final stage R (where R≧2) of said wavelength selection unit; and
an optical receiver for receiving optical signals that are outputted from said optical multiplexer;
wherein said first-stage gate array for wavelength selection and said second-stage gate array for wavelength selection include one or more optical switch devices, wherein said one or more optical switch devices comprise:
a plurality of optical switches for ON/OFF switching of beams by means of voltage that is applied to liquid crystal;
one optical fiber installed on each side of each of said optical switches;
a voltage application switching element for switching the optical switch of each of said plurality of optical switches to which voltage is applied;
a plurality of switching lines and voltage application lines that are disposed in rows and columns for applying voltage to said voltage application switching element;
a driver for switching between applying or not applying voltage to said switching lines and voltage application lines; and
a substrate on which said optical switches are arranged that includes one or more holes that are formed for installing an end of one or more optical fibers.

6. An optical reception device comprising:
a wavelength selection unit that is provided with at least:
an optical gate array for space selection that is composed of first to Sth (where S≧2) optical gates,
a first-stage optical wavelength router for outputting each of optical signals that are received from K0 (where K0=S) input ports that are each connected to a respective optical gate of K0 optical gates of said optical gate array for space selection from any of K1 (where K1≧2) output ports according to wavelength,
a first-stage optical gate array for wavelength selection that is composed of K1 optical gates that are each connected to a respective output port of K1 output ports in said first-stage optical wavelength router,
a second-stage optical wavelength router for outputting each of optical signals that are received from K1 input ports that are each connected to a respective optical gate of the K1 optical gates in said first-stage optical gate array for wavelength selection from any of K2 (where K2≧2) output ports according to wavelength, and
a second-stage optical gate array for wavelength selection that is composed of K2 optical gates that are each connected to a respective output port of the K2 output ports of said second-stage optical wavelength router;
an (R+1)th-stage optical wavelength router for outputting optical signals that are received from KR input ports that are each connected to a respective optical gate of KR optical gates that constitute the optical gate array for wavelength selection of the next to final stage R (where R≧2) of said wavelength selection unit from any of V (where V≧2) output ports according to wavelength; and
V optical receivers for receiving each of the optical signals that are outputted from the V output ports of said (R+1)th-stage optical wavelength router;
wherein the first-stage gate array for wavelength selection and said second-stage gate array for wavelength selection in said optical reception device include an optical switch device wherein said optical switching device comprises:
a plurality of optical switches for ON/OFF switching of beams by means of voltage that is applied to liquid crystal;
one optical fiber installed on each side of each of said optical switches;
a voltage application switching element for switching the optical switch of each of said plurality of optical switches to which voltage is applied;
a plurality of switching lines and voltage application lines that are disposed in rows and columns for applying voltage to said voltage application switching element;
a driver for switching between applying or not applying voltage to said switching lines and voltage application lines; and
a substrate on which said optical switches are arranged that includes one or more holes that are formed for installing an end of one or more optical fibers.

7. An optical switch network, comprising:
first to Sth (where S≧2) optical transmitter array groups that are each constituted by first to Wth (where W≧2) optical transmitter arrays for transmitting optical signals of each of different wavelength groups, one wavelength group being V (where V≧2) wavelengths;
first to Sth optical multiplexer/demultiplexers for receiving as input W optical signals that have been transmitted from said first to Sth optical transmitter array groups, demultiplexing wavelength division multiplexed optical signals in which W optical signals have been multiplexed, and outputting from WS (where WS=W×S) output ports; and
WS optical reception devices in which first to Sth optical gates are each connected to a different output port of said first to Sth optical multiplexer/demultiplexers wherein said optical reception devices comprise:

a wavelength selection unit that is provided with at least:

an optical gate array for space selection that is composed of first to Sth (where S≧2) optical gates, a first-stage optical wavelength router for outputting each of optical signals that are received from K0 (where K0=S) input ports that are each connected to a respective optical gate of K0 optical gates of said optical gate array for space selection from any of K1 (where K1≧2) output ports according to wavelength, a first-stage optical gate array for wavelength selection that is composed of K1 optical gates that are each connected to a respective output port of K1 output ports in said first-stage optical wavelength router, a second-stage optical wavelength router for outputting each of optical signals that are received from K1 input ports that are each connected to a respective optical gate of the K1 optical gates in said first-stage optical gate array for wavelength selection from any of K2 (where K2≧2) output ports according to wavelength, and a second-stage optical gate array for wavelength selection that is composed of K2 optical gates that are each connected to a respective output port of the K2 output ports of said second-stage optical wavelength router;

an (R+1)th-stage optical wavelength router for outputting optical signals that are received from KR input ports that are each connected to a respective optical gate of KR optical gates that constitute the optical gate array for wavelength selection of the next to final stage R (where R≧2) of said wavelength selection unit from any of V (where V≧2) output ports according to wavelength; and V optical receivers for receiving each of the optical signals that are outputted from the V output ports of said (R+1)th-stage optical wavelength router;

wherein the first-stage gate array for wavelength selection and said second-stage gate array for wavelength selection in said optical reception device include an optical switch device wherein said optical switching device comprises:

a plurality of optical switches for ON/OFF switching of beams by means of voltage that is applied to liquid crystal;

one optical fiber installed on each side of each of said optical switches;

a voltage application switching element for switching the optical switch of each of said plurality of optical switches to which voltage is applied;

a plurality of switching lines and voltage application lines that are disposed in rows and columns for applying voltage to said voltage application switching element;

a driver for switching between applying or not applying voltage to said switching lines and voltage application lines; and a substrate on which said optical switches are arranged that includes one or more holes that are formed for installing an end of one or more optical fibers.

8. An optical reception device, comprising:

an array optical selector that has N (where N≧2) paths in which M (where M≧2) paths can turn ON/OFF simultaneously and that can perform selective ON/OFF switching of said N paths, a first-stage optical gate array that is composed of M optical gates that are each connected to a respective output port of M output ports of said array optical selector, an optical wavelength router for outputting each of optical signals that are received from M input ports that are each connected to a respective optical gate of the M optical gates that constitute said first-stage optical gate array from any of W (where W≧2) output ports according to wavelength, a second-stage optical gate array that is composed of W optical gates that are each connected to a respective output port of said optical wavelength router, an optical multiplexer for multiplexing and outputting optical signals that are outputted from the W optical gates that constitute said second-stage optical gate array, and an optical receiver for receiving optical signals that are outputted from said optical multiplexer;

wherein said first-stage gate array for wavelength selection and said second-stage gate array for wavelength selection in said optical reception device include one or more optical switch devices wherein said one or more optical switching devices comprise:

a plurality of optical switches for ON/OFF switching of beams by means of voltage that is applied to liquid crystal;

one optical fiber installed on each side of each of said optical switches;

a voltage application switching element for switching the optical switch of each of said plurality of optical switches to which voltage is applied;

a plurality of switching lines and voltage application lines that are disposed in rows and columns for applying voltage to said voltage application switching element;

a driver for switching between applying or not applying voltage to said switching lines and voltage application lines; and a substrate on which said optical switches are arranged that includes one or more holes that are formed for installing an end of one or more optical fibers.

9. An optical reception device according to claim 8, wherein said M is equal to W.

10. An optical reception device, comprising:

a wavelength selection unit that is provided with at least:

an array optical selector that has N (where N≧2) paths in which M (where M≧2) paths can turn ON/OFF simultaneously and that can perform selective ON/OFF switching of said N paths, an optical gate array for space selection that is composed of M optical gates that are each connected to a respective output port of M output ports of said array optical selector, a first-stage optical wavelength router for outputting each of optical signals that are received from K0 (where K0=M) input ports that are each connected to a respective optical gate of K0 optical gates of said optical gate array for space selection from any of K1 (where K1≧2) output ports according to wavelength, a first-stage optical gate array for wavelength selection that is composed of K1 optical gates that are each connected to a respective output port of the K1 output ports in said first-stage optical wavelength router, a second-stage optical wavelength router for outputting each of optical signals that are received from the K1 input ports that are each connected to a respective optical gate of the K1 optical gates in said first-stage optical gate array for wavelength selection from any of K2 (where K2≧2) output ports according to wavelength, and a second-stage optical gate array for wavelength selection that is composed of K2 optical gates that are each connected to a respective output port of the K2 output ports of said second-stage optical wavelength router;

an optical multiplexer for multiplexing and outputting optical signals that are received from KR input ports that are each connected to a respective optical gate of KR optical gates that constitute the optical gate array for wavelength selection of the final stage R (where R≧2) of said wavelength selection unit; and an optical receiver for receiving optical signals that are outputted from said optical multiplexer;

wherein said first-stage gate array for wavelength selection and said second-stage gate array for wavelength selection in said optical reception device include one or more optical switch devices wherein said one or more optical switching devices comprise:

a plurality of optical switches for ON/OFF switching of beams by means of voltage that is applied to liquid crystal;

one optical fiber installed on each side of each of said optical switches;

a voltage application switching element for switching the optical switch of each of said plurality of optical switches to which voltage is applied;

a plurality of switching lines and voltage application lines that are disposed in rows and columns for applying voltage to said voltage application switching element;

a driver for switching between applying or not applying voltage to said switching lines and voltage application lines; and a substrate on which said optical switches are arranged that includes one or more holes that are formed for installing an end of one or more optical fibers.

11. An optical switch network, comprising:

first to Sth (where S=M×N) optical transmitter groups that are each composed of first to Wth (where W≧2) optical transmitters for transmitting optical signals of different wavelengths;

first to Sth optical multiplexer/demultiplexers for receiving as input the W optical signals that are transmitted from each of said first to Sth optical transmitter groups, demultiplexing wavelength division multiplexed optical signals in which W optical signals have been multiplexed, and outputting from WS (where WS=W× S=W×M×N) output ports; and WS optical reception devices in which first to Sth input ports are each connected to a different output port of said first to Sth optical multiplexer/demultiplexers, wherein said optical reception devices comprise:

an array optical selector that has N (where N≧2) paths in which M (where M≧2) paths can turn ON/OFF simultaneously and that can perform selective ON/OFF switching of said N paths, a first-stage optical gate array that is composed of M optical gates that are each connected to a respective output port of M output ports of said array optical selector, an optical wavelength router for outputting each of optical signals that are received from M input ports that are each connected to a respective optical gate of M optical gates that constitute said first-stage optical gate array from any of W (where W≧2) output ports according to wavelength;

a second-stage optical gate array that is composed of W optical gates that are each connected to a respective output port of said optical wavelength router;

an optical multiplexer for multiplexing and outputting optical signals that are outputted from the W optical gates that constitute said second-stage optical gate array; and an optical receiver for receiving optical signals that are outputted from said optical multiplexer;

wherein said first-stage gate array for wavelength selection and said second-stage gate array for wavelength selection in said optical reception device include one or more optical switch devices wherein said one or more optical switching devices comprises:

a plurality of optical switches for ON/OFF switching of beams by means of voltage that is applied to liquid crystal;

one optical fiber installed on each side of each of said optical switches;

a voltage application switching element for switching the optical switch of each of said plurality of optical switches to which voltage is applied;

a plurality of switching lines and voltage application lines that are disposed in rows and columns for applying voltage to said voltage application switching element;

a driver for switching between applying or not applying voltage to said switching lines and voltage application lines; and a substrate on which said optical switches are arranged that includes one or more holes that are formed for installing an end of one or more optical fibers.

12. An optical reception device, comprising:

a wavelength selection unit that is provided with at least:

an array optical selector that has N (where N≧2) paths in which M (where M≧2) paths can turn ON/OFF simultaneously and that can perform selective ON/OFF switching of said N paths, an optical gate array for space selection that is composed of M optical gates that are each connected to a respective output port of M output ports of said array optical selector, a first-stage optical wavelength router for outputting each of optical signals that are received from K0 (where K0=M) input ports that are each connected to a respective optical gate of K0 optical gates of said optical gate array for space selection from any of K1 (where K1≧2) output ports according to wavelength, a first-stage optical gate array for wavelength selection that is composed of K1 optical gates that are each connected to a respective output port of the K1 output ports in said first-stage optical wavelength router, a second-stage optical wavelength router for outputting each of optical signals that are received from K1 input ports that are each connected to a respective optical gate of the K1 optical gates of said first-stage optical gate array for wavelength selection from any of K2 (where K2≧2) output ports according to wavelength, and a second-stage optical gate array for wavelength selection that is composed of K2 optical gates that are each connected to a respective output port of the K2 output ports of said second-stage optical wavelength router;

an (R+1)th-stage optical wavelength router for outputting optical signals that are received from KR input ports that are each connected to a respective optical gate of KR optical gates that constitute the optical gate array for wavelength selection of the next to final stage R (where R≧2) of said wavelength selection unit from any of V (where V≧2) output ports according to wavelength; and V optical receivers for receiving each of the optical signals that are outputted from the V output ports in the (R+1)th-stage optical wavelength routers;

wherein said first-stage gate array for wavelength selection and said second-stage gate array for wavelength selection in said optical reception device include one or more optical switch devices wherein one or more optical switches devices comprise:

a plurality of optical switches for ON/OFF switching of beams by means of voltage that is applied to liquid crystal;

one optical fiber installed on each side of each of said optical switches;

a voltage application switching element for switching the optical switch of each of said plurality of optical switches to which voltage is applied;

a plurality of switching lines and voltage application lines that are disposed in rows and columns for applying voltage to said voltage application switching element;

a driver for switching between applying or not applying voltage to said switching lines and voltage application lines; and a substrate on which said optical switches are arranged that includes one or more holes that are formed for installing an end of one or more optical fibers.

13. An optical switch network, comprising:

first to Sth (where S≧2) optical transmitter array groups that are each composed of first to Wth (where W≧2) optical transmitter arrays for transmitting optical signals of different wavelength groups in which V (where V≧2) wavelengths are one wavelength group;

first to Sth optical multiplexer/demultiplexers for receiving as input W optical signals that are transmitted from said first to Sth optical transmitter array groups, demultiplexing wavelength division multiplexed optical signals in which W optical signals have been multiplexed, and outputting from WS (where WS=W×S=W×M×N) output ports; and WS optical reception devices in which first to Sth input ports are each connected to a different output port of said first to Sth optical multiplexer/demultiplexers, wherein said optical reception devices comprise:

a wavelength selection unit that is provided with at least;

an array optical selector that has N (where N≧2) paths in which M (where M≧2) paths can turn ON/OFF simultaneously and that can perform selective ON/OFF switching of said N paths, an optical gate array for space selection that is composed of M optical gates that are each connected to a respective output port of M output ports of said array optical selector, a first-stage optical wavelength router for outputting each of optical signals that are received from K0 (where K0=M) input ports that are each connected to a respective optical gate of K0 optical gates of said optical gate array for space selection from any of K1 (where K1≧2) output ports according to wavelength, a first-stage optical gate array for wavelength selection that is composed of K1 optical gates that are each connected to a respective output port of the K1 output ports in said first-stage optical wavelength router, a second-stage optical wavelength router for outputting each of optical signals that are received from K1 input ports that are each connected to a respective optical gate of the K1 optical gates of said first-stage optical gate array for wavelength selection from any of K2 (where K2≧2) output ports according to wavelength, and a second-stage optical gate array for wavelength selection that is composed of K2 optical gates that are each connected to a respective output port of the K2 output ports of said second-stage optical wavelength router;

an (R+1)th-stage optical wavelength router for outputting optical signals that are received from KR input ports that are each connected to a respective optical gate of KR optical gates that constitute the optical gate array for wavelength selection of the next to final stage R (where R≧2) of said wavelength selection unit from any of V (where V≧2) output ports according to wavelength; and V optical receivers for receiving each of the optical signals that are outputted from the V output ports in the (R+1)th-stage optical wavelength routers;

wherein said first-stage gate array for wavelength selection and said second-stage gate array for wavelength selection in said optical reception device include one or more optical switch devices wherein one or more optical switches devices comprises:

a plurality of optical switches for ON/OFF switching of beams by means of voltage that is applied to liquid crystal;

one optical fiber installed on each side of each of said optical switches;

a voltage application switching element for switching the optical switch of each of said plurality of optical switches to which voltage is applied;

a plurality of switching lines and voltage application lines that are disposed in rows and columns for applying voltage to said voltage application switching element;

a driver for switching between applying or not applying voltage to said switching lines and voltage application lines; and a substrate on which said optical switches are arranged that includes one or more holes that are formed for installing an end of one or more optical fibers.

14. An optical reception device according to claim 4, wherein the numbers K1-KR of optical gates in said first-stage to Rth-stage optical gate arrays are prime numbers or 4.

* * * * *